(12) United States Patent
Hosseini et al.

(10) Patent No.: US 11,330,577 B2
(45) Date of Patent: May 10, 2022

(54) SEARCH SPACE ACTIVATION FOR CHANNEL MONITORING

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US); Jing Sun, San Diego, CA (US); Mostafa Khoshnevisan, San Diego, CA (US); Wei Yang, San Diego, CA (US); Seyed Ali Akbar Fakoorian, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 16/734,250

(22) Filed: Jan. 3, 2020

(65) Prior Publication Data
US 2020/0221431 A1    Jul. 9, 2020

Related U.S. Application Data

(60) Provisional application No. 62/789,851, filed on Jan. 8, 2019.

(51) Int. Cl.
*H04W 72/04*    (2009.01)
*H04W 72/12*    (2009.01)

(52) U.S. Cl.
CPC ......... *H04W 72/042* (2013.01); *H04W 72/12* (2013.01)

(58) Field of Classification Search
CPC .... H04W 72/04; H04W 72/12; H04W 72/042
See application file for complete search history.

(56) References Cited

U.S. PATENT DOCUMENTS

2017/0134880 A1\* 5/2017 Rico Alvarino .... H04W 72/044
2017/0264417 A1  9/2017 Eriksson et al.
(Continued)

FOREIGN PATENT DOCUMENTS

CA        3057283 A1    9/2018
WO    WO-2019217440 A1  11/2019

OTHER PUBLICATIONS

3GPP TS 38.213: "3rd Generation Partnership Project, Technical Specification Group Radio Access Network, NR, Physical Layer Procedures for Control (Release 15)", 3GPP Standard, Technical Specification, 3GPP TS 38.213, 3rd Generation Partnership Project (3GPP), Mobile Competence Centre, 650, Route Des Lucioles, F-06921 Sophia-Antipolis Cedex, France, vol. RAN WG1, No. V15.3.0, Oct. 1, 2018 (Oct. 1, 2018), pp. 1-101, XP051487512, [retrieved on Oct. 1, 2018] section 11.1.1.\*chapters 5. 7-7.5. 9.2.2\*.
(Continued)

*Primary Examiner* — Chi Ho A Lee
*Assistant Examiner* — Andrew Lee
(74) *Attorney, Agent, or Firm* — Holland & Hart LLP

(57) ABSTRACT

Methods, systems, and devices for wireless communications are described. A user equipment may be configured to monitor a first set of decoding candidates within a first search space for receiving a physical downlink control channel message. A base station may identify downlink data for the user equipment and may transmit a signal to the user equipment. The user equipment may receive the signal within the first search space. In some cases, the signal may include a command for activating a second search space. The user equipment may monitor a second set of decoding candidates within the second search space based on receiving the signal. The user equipment communicate, with the base station, based on monitoring the first set of decoding
(Continued)

candidates within the first search space and the second set of decoding candidates within the second search space.

30 Claims, 17 Drawing Sheets

(56) References Cited

U.S. PATENT DOCUMENTS

| | | | | |
|---|---|---|---|---|
| 2019/0158326 A1* | 5/2019 | Liao | .................. | H04L 5/0048 |
| 2019/0207796 A1* | 7/2019 | Hwang | .................. | H04L 1/0045 |
| 2019/0297609 A1* | 9/2019 | Pan | .................. | H04L 5/001 |
| 2019/0305867 A1* | 10/2019 | Tseng | .................. | H04W 24/10 |
| 2020/0100311 A1* | 3/2020 | Cirik | .................. | H04W 72/042 |
| 2020/0178232 A1* | 6/2020 | Li | .................. | H04L 5/0092 |
| 2020/0252956 A1* | 8/2020 | Liu | .................. | H04L 1/1671 |
| 2021/0037558 A1* | 2/2021 | Xu | .................. | H04W 72/1273 |

OTHER PUBLICATIONS

Interdigital et al., "Discussion on Triggering of Power Mode Adaptation", 3GPP Draft, 3GPP TSG RAN WG1 Meeting #95, R1-1813244 UE Adaptation Based on Traffic Final, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018 Nov. 11, 2018 (Nov. 11, 2018), XP051555247, 5 Pages, Retrieved from the Internet: URL:http://www.3gpp.org/ftp/Meetings%5F3GPP%5FSYNC/RAN1/Docs/R1%2D1813244%2Ezip [retrieved on Nov. 11, 2018] Section 2.

Interdigital Communications: "DL Control Channel Framework for NR", 3GPP Draft, 3GPP TSG-RAN WG1 #86bis, R1-1610089, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016 Oct. 9, 2016 (Oct. 9, 2016), XP051150114, pp. 1-5, Retrieved from the Internet: URL:http://www.3gpp.org/ftp/Meetings_3GPP_SYNC/RAN1/Docs/ [retrieved on Oct. 9, 2016] Section 3.

International Search Report and Written Opinion—PCT/US2020/012331—ISA/EPO—dated Apr. 14, 2020.

Qualcomm Incorporated: "UE Adaptation to The Traffic and UE Power Consumption Characteristics," 3GPP Draft, 3GPP TSG-RAN WG1 Meeting #95, R1-1813447, UE Adaptation for Power Saving, 3rd Generation Partnership Project (3GPP), Mobile Competence Centre, 650, Route Des Lucioles, F-06921, Sophia-Antipolis Cedex, France, vol. RAN WG1, No. Spokane, Washington, USA, Nov. 12, 2018-Nov. 16, 2018, Nov. 11, 2018, XP051555486, 20 Pages, Retrieved from the Internet: URL: http://www.3gpp.org/ftp/Meetings%5F3GPP%5FSYNC/RAN1/Docs/R1%2D1813447%2Ezip [retrieved on Nov. 11, 2018], Section 5.2, Section 4.3.2, the whole document.

* cited by examiner

SEARCH SPACE ACTIVATION FOR CHANNEL MONITORING

CROSS REFERENCE

The present Application for Patent claims the benefit of U.S. Provisional Patent Application No. 62/789,851 by HOSSEINI et al., entitled "SEARCH SPACE ACTIVATION FOR CHANNEL MONITORING," filed Jan. 8, 2019, assigned to the assignee hereof, and which is expressly incorporated by reference herein.

BACKGROUND

The following relates generally to wireless communications, and more specifically to search space activation for channel monitoring.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, search spaces may be configured for UEs. These search spaces may contain one or more control resource sets (CORESETs) containing multiple control channel elements (CCEs). Some search space configuration techniques may be deficient for some communications, such as ultra-reliable low latency communications, and improved search space configuration techniques are desired.

SUMMARY

The described techniques relate to improved methods, systems, devices, and apparatuses that support search space activation for channel monitoring. Generally, the described techniques support search space activation for ultra-reliable low latency communications. In some systems, a base station may transmit control information to a user equipment (UE) within one or more search space decoding candidates. The base station may configure a search space set by hashing these decoding candidates within a set of control channel elements (CCEs) at one or more aggregation levels. In some cases, a UE may be configured to monitor a first set of decoding candidates in a first search space. In some cases, the base station may identify a packet, such as a downlink data packet, for a UE, and may schedule a downlink transmission of the data packet. The base station may transmit an indication to the UE, where the indication may include a command for the UE to switch search space sets. In some cases, the UE may be configured to switch search space sets to monitor more occasions or a larger number of candidates.

In some cases, based on decoding the received command, the UE may begin monitoring a second set of decoding candidates within a second search space. For example, the UE may monitor a second set of decoding candidates within the second search space based on receiving the command. In some cases, the UE may cease to monitor the first set of decoding candidates of the first search space, and may monitor the second set of decoding candidates of the second search space. In some cases, the UE may transmit a message acknowledging the signal received within the first search space. Based on transmitting the acknowledgement message, the UE may cease to monitor the first set of decoding candidates of the first search space and may begin monitoring the second set of decoding candidates of the second search space. In some cases, the UE may be configured to concurrently monitor the first search space and the second search space.

A method of wireless communication is described. The method may include monitoring a first set of decoding candidates within a first search space for receiving a physical downlink control channel message, receiving, from a base station, a signal within the first search space, the signal including a command for activating a second search space, monitoring a second set of decoding candidates within the second search space based on receiving the signal, and communicating, with the base station, based on monitoring the first set of decoding candidates within the first search space and the second set of decoding candidates within the second search space.

An apparatus for wireless communication is described. The apparatus may include a processor, memory in electronic communication with the processor, and instructions stored in the memory. The instructions may be executable by the processor to cause the apparatus to monitor a first set of decoding candidates within a first search space for receiving a physical downlink control channel message, receive, from a base station, a signal within the first search space, the signal including a command for activating a second search space, monitor a second set of decoding candidates within the second search space based on receiving the signal, and communicate, with the base station, based on monitoring the first set of decoding candidates within the first search space and the second set of decoding candidates within the second search space.

Another apparatus for wireless communication is described. The apparatus may include means for monitoring a first set of decoding candidates within a first search space for receiving a physical downlink control channel message, receiving, from a base station, a signal within the first search space, the signal including a command for activating a second search space, monitoring a second set of decoding candidates within the second search space based on receiving the signal, and communicating, with the base station, based on monitoring the first set of decoding candidates within the first search space and the second set of decoding candidates within the second search space.

A non-transitory computer-readable medium storing code for wireless communication is described. The code may include instructions executable by a processor to monitor a first set of decoding candidates within a first search space for receiving a physical downlink control channel message, receive, from a base station, a signal within the first search space, the signal including a command for activating a second search space, monitor a second set of decoding candidates within the second search space based on receiving the signal, and communicate, with the base station, based on monitoring the first set of decoding candidates within the first search space and the second set of decoding candidates within the second search space.

Some examples of the method, apparatuses, and non-transitory computer-readable medium described herein may further include operations, features, means, or instructions for transmitting a message acknowledging the signal received within the first search space, where monitoring the second set of decoding candidates within the second search space may be based on transmitting the message.

Some examples of the method, apparatuses, and non-transitory computer-readable medium described herein may further include operations, features, means, or instructions for monitoring the first set of decoding candidates within the first search space and monitoring the second set of decoding candidates within the second search space occur concurrently. Some examples of the method, apparatuses, and non-transitory computer-readable medium described herein may further include operations, features, means, or instructions for monitoring the first set of decoding candidates within the first search space for a threshold duration after receiving the signal, where monitoring the second set of decoding candidates within the second search space occurs after expiration of the threshold duration.

Some examples of the method, apparatuses, and non-transitory computer-readable medium described herein may further include operations, features, means, or instructions for receiving, from the base station, a second signal within the first search space, the second signal including a command for releasing the first search space, where monitoring the second set of decoding candidates within the second search space may be based on receiving the second signal. Some examples of the method, apparatuses, and non-transitory computer-readable medium described herein may further include operations, features, means, or instructions for ceasing monitoring the first set of decoding candidates within the first search space based on receiving the signal.

In some examples of the method, apparatuses, and non-transitory computer-readable medium described herein, the signal includes a downlink control indicator. Some examples of the method, apparatuses, and non-transitory computer-readable medium described herein may further include operations, features, means, or instructions for identifying an index value of a location of the downlink control indicator, and determining one or more monitoring occasions for the second search space based on the index value of the location, where monitoring the second set of decoding candidates may be based on the one or more monitoring occasions.

Some examples of the method, apparatuses, and non-transitory computer-readable medium described herein may further include operations, features, means, or instructions for identifying a bitmap included in the downlink control indicator, and determining one or more monitoring occasions for the second search space based on the bitmap, where monitoring the second set of decoding candidates may be based on the one or more monitoring occasions.

In some examples of the method, apparatuses, and non-transitory computer-readable medium described herein, the bitmap includes 14 bits. Some examples of the method, apparatuses, and non-transitory computer-readable medium described herein may further include operations, features, means, or instructions for initializing a timer associated with the second search space based on receiving the signal, where monitoring the second set of decoding candidates within the second search space may be based on the timer.

Some examples of the method, apparatuses, and non-transitory computer-readable medium described herein may further include operations, features, means, or instructions for initializing a timer associated with the second search space based on receiving the signal, receiving, from the base station, a second signal associated with reception of downlink data within the second search space, and reinitializing the timer associated with the second search space based on receiving the second signal, where monitoring the second set of decoding candidates within the second search space may be based on the timer.

Some examples of the method, apparatuses, and non-transitory computer-readable medium described herein may further include operations, features, means, or instructions for ceasing monitoring the second set of decoding candidates within the second search space based on expiration of the timer. Some examples of the method, apparatuses, and non-transitory computer-readable medium described herein may further include operations, features, means, or instructions for receiving, from the base station, a second signal within the second search space, the second signal including a command for releasing the second search space, and ceasing monitoring the second set of decoding candidates within the second search space based on receiving the second signal.

In some examples of the method, apparatuses, and non-transitory computer-readable medium described herein, the second signal may be included in a downlink control indicator. Some examples of the method, apparatuses, and non-transitory computer-readable medium described herein may further include operations, features, means, or instructions for receiving, from the base station, a second signal associated with reception of downlink data within the first search space, and ceasing monitoring the second set of decoding candidates within the second search space based on receiving the second signal.

Some examples of the method, apparatuses, and non-transitory computer-readable medium described herein may further include operations, features, means, or instructions for transmitting, to the base station, a scheduling request for an upcoming uplink transmission, where monitoring the second set of decoding candidates within the second search space may be based on transmitting the scheduling request. Some examples of the method, apparatuses, and non-transitory computer-readable medium described herein may further include operations, features, means, or instructions for receiving, from the base station, a second signal within the second search space, the second signal including a command for activating a third search space, and monitoring a third set of decoding candidates within the third search space based on receiving the second signal.

Some examples of the method, apparatuses, and non-transitory computer-readable medium described herein may further include operations, features, means, or instructions for receiving, from the base station, a third signal within the third search space, the third signal including a command for releasing the third search space and reverting back to the second search space, and monitoring the second set of decoding candidates within the second search space based on receiving the third signal. Some examples of the method, apparatuses, and non-transitory computer-readable medium described herein may further include operations, features, means, or instructions for receiving, from the base station, a third signal within the third search space, the third signal including a command for releasing the third search space and reverting back to the first search space, and monitoring the first set of decoding candidates within the first search space based on receiving the third signal.

Some examples of the method, apparatuses, and non-transitory computer-readable medium described herein may further include operations, features, means, or instructions for initializing a first timer associated with the third search space based on receiving the second signal, monitoring the second set of decoding candidates within the second search space based on expiration of the first timer, initializing a second timer associated with the second search space based on monitoring the second set of decoding candidates within the second search space, and monitoring the first set of decoding candidates within the first search space based on expiration of the second timer.

In some examples of the method, apparatuses, and non-transitory computer-readable medium described herein, the third set of decoding candidates within the third search space may be greater than the second set of decoding candidates within the second search space. In some examples of the method, apparatuses, and non-transitory computer-readable medium described herein, the third set of decoding candidates within the third search space may be associated with bi-directional data transmission.

In some examples of the method, apparatuses, and non-transitory computer-readable medium described herein, the physical downlink control channel message may be associated with ultra-reliable low latency communications. In some examples of the method, apparatuses, and non-transitory computer-readable medium described herein, a first periodicity associated with the first set of decoding candidates within the first search space may be greater than a second periodicity associated with the second set of decoding candidates within the second search space.

In some examples of the method, apparatuses, and non-transitory computer-readable medium described herein, the second search space includes more decoding candidates in a monitoring occasion than the first search space, the first search space and the second search space having an equal number of monitoring occasions per slot, or the second search space and the first search space include an equal number of decoding candidates in the monitoring occasion, the second search space having more monitoring occasions per slot than the first search space, or a combination thereof. In some examples of the method, apparatuses, and non-transitory computer-readable medium described herein, the command for activating the second search space includes 2 bits.

A method of wireless communication is described. The method may include identifying downlink data for a UE configured to monitor a first set of decoding candidates within a first search space, transmitting, to the UE based on the downlink data, a signal within the first search space, the signal including a command for activating a second search space associated with a second set of decoding candidates, and communicating, with the UE, based on transmitting the signal within the first search space.

An apparatus for wireless communication is described. The apparatus may include a processor, memory in electronic communication with the processor, and instructions stored in the memory. The instructions may be executable by the processor to cause the apparatus to identify downlink data for a UE configured to monitor a first set of decoding candidates within a first search space, transmit, to the UE based on the downlink data, a signal within the first search space, the signal including a command for activating a second search space associated with a second set of decoding candidates, and communicate, with the UE, based on transmitting the signal within the first search space.

Another apparatus for wireless communication is described. The apparatus may include means for identifying downlink data for a UE configured to monitor a first set of decoding candidates within a first search space, transmitting, to the UE based on the downlink data, a signal within the first search space, the signal including a command for activating a second search space associated with a second set of decoding candidates, and communicating, with the UE, based on transmitting the signal within the first search space.

A non-transitory computer-readable medium storing code for wireless communication is described. The code may include instructions executable by a processor to identify downlink data for a UE configured to monitor a first set of decoding candidates within a first search space, transmit, to the UE based on the downlink data, a signal within the first search space, the signal including a command for activating a second search space associated with a second set of decoding candidates, and communicate, with the UE, based on transmitting the signal within the first search space.

Some examples of the method, apparatuses, and non-transitory computer-readable medium described herein may further include operations, features, means, or instructions for configuring the UE to monitor the second set of decoding candidates within the second search space based on transmitting the signal. Some examples of the method, apparatuses, and non-transitory computer-readable medium described herein may further include operations, features, means, or instructions for receiving, from the UE, a message acknowledging the signal transmitted within the first search space.

Some examples of the method, apparatuses, and non-transitory computer-readable medium described herein may further include operations, features, means, or instructions for configuring the UE to concurrently monitor the first set of decoding candidates within the first search space and the second set of decoding candidates within the second search space. Some examples of the method, apparatuses, and non-transitory computer-readable medium described herein may further include operations, features, means, or instructions for configuring the UE to monitor the first set of decoding candidates within the first search space for a threshold duration after transmitting the signal, and configuring the UE to monitor the second set of decoding candidates within the second search space after expiration of the threshold duration.

Some examples of the method, apparatuses, and non-transitory computer-readable medium described herein may further include operations, features, means, or instructions for transmitting, to the UE, a second signal within the first search space, the second signal including a command for releasing the first search space, and configuring the UE to monitor the second set of decoding candidates within the second search space based on transmitting the second signal. Some examples of the method, apparatuses, and non-transitory computer-readable medium described herein may further include operations, features, means, or instructions for configuring the UE to cease monitoring the first set of decoding candidates within the first search space based on transmitting the signal.

In some examples of the method, apparatuses, and non-transitory computer-readable medium described herein, the signal includes a downlink control indicator. Some examples of the method, apparatuses, and non-transitory computer-readable medium described herein may further include operations, features, means, or instructions for configuring the UE to initialize a timer associated with the second search space based on transmitting the signal, and configuring the UE to monitor the second set of decoding candidates within the second search space based on the timer.

Some examples of the method, apparatuses, and non-transitory computer-readable medium described herein may further include operations, features, means, or instructions for configuring the UE to initialize a timer associated with the second search space based on transmitting the signal, transmitting, to the UE, a second signal associated with transmission of downlink data within the second search space, configuring the UE to reinitialize the timer associated with the second search space based on transmitting the second signal, and configuring the UE to monitor the second set of decoding candidates within the second search space may be based on the timer.

Some examples of the method, apparatuses, and non-transitory computer-readable medium described herein may further include operations, features, means, or instructions for configuring the UE to cease monitoring the second set of decoding candidates within the second search space based on expiration of the timer.

Some examples of the method, apparatuses, and non-transitory computer-readable medium described herein may further include operations, features, means, or instructions for transmitting, to the UE, a second signal within the second search space, the second signal including a command for releasing the second search space, and configuring the UE to cease monitoring the second set of decoding candidates within the second search space based on transmitting the second signal.

In some examples of the method, apparatuses, and non-transitory computer-readable medium described herein, the second signal may be included in a downlink control indicator. Some examples of the method, apparatuses, and non-transitory computer-readable medium described herein may further include operations, features, means, or instructions for transmitting, to the UE, a second signal associated with transmission of downlink data within the first search space, and configuring the UE to cease monitoring the second set of decoding candidates within the second search space based on transmitting the second signal.

Some examples of the method, apparatuses, and non-transitory computer-readable medium described herein may further include operations, features, means, or instructions for receiving, from the UE, a scheduling request for an uplink transmission, and configuring the UE to monitor the second set of decoding candidates within the second search space based on receiving the scheduling request. Some examples of the method, apparatuses, and non-transitory computer-readable medium described herein may further include operations, features, means, or instructions for transmitting, to the UE, a second signal within the second search space, the second signal including a command for activating a third search space associated with a third set of decoding candidates.

Some examples of the method, apparatuses, and non-transitory computer-readable medium described herein may further include operations, features, means, or instructions for transmitting, to the UE, a third signal within the third search space, the third signal including a command for releasing the third search space and reverting back to the second search space. Some examples of the method, apparatuses, and non-transitory computer-readable medium described herein may further include operations, features, means, or instructions for transmitting, to the UE, a third signal within the third search space, the third signal including a command for releasing the third search space and reverting back to the first search space.

Some examples of the method, apparatuses, and non-transitory computer-readable medium described herein may further include operations, features, means, or instructions for configuring the UE to initialize a first timer associated with the third search space based on transmitting the second signal, configuring the UE to monitor the second set of decoding candidates within the second search space based on expiration of the first timer, configuring the UE to initialize a second timer associated with the second search space based on monitoring the second set of decoding candidates within the second search space, and configuring the UE to monitor the first set of decoding candidates within the first search space based on expiration of the second timer.

In some examples of the method, apparatuses, and non-transitory computer-readable medium described herein, the third set of decoding candidates within the third search space may be greater than the second set of decoding candidates within the second search space. In some examples of the method, apparatuses, and non-transitory computer-readable medium described herein, the third set of decoding candidates within the third search space may be associated with bi-directional data transmission.

In some examples of the method, apparatuses, and non-transitory computer-readable medium described herein, the downlink data may be associated with ultra-reliable low latency communications. In some examples of the method, apparatuses, and non-transitory computer-readable medium described herein, a first periodicity associated with the first set of decoding candidates within the first search space may be greater than a second periodicity associated with the second set of decoding candidates within the second search space.

In some examples of the method, apparatuses, and non-transitory computer-readable medium described herein, the second search space includes more decoding candidates in a monitoring occasion than the first search space, the first search space and the second search space having an equal number of monitoring occasions per slot, or the second search space and the first search space include an equal number of decoding candidates in the monitoring occasion, the second search space having more monitoring occasions per slot than the first search space, or a combination thereof. In some examples of the method, apparatuses, and non-transitory computer-readable medium described herein, the command for activating the second search space includes 2 bits.

DETAILED DESCRIPTION

Figure 1:
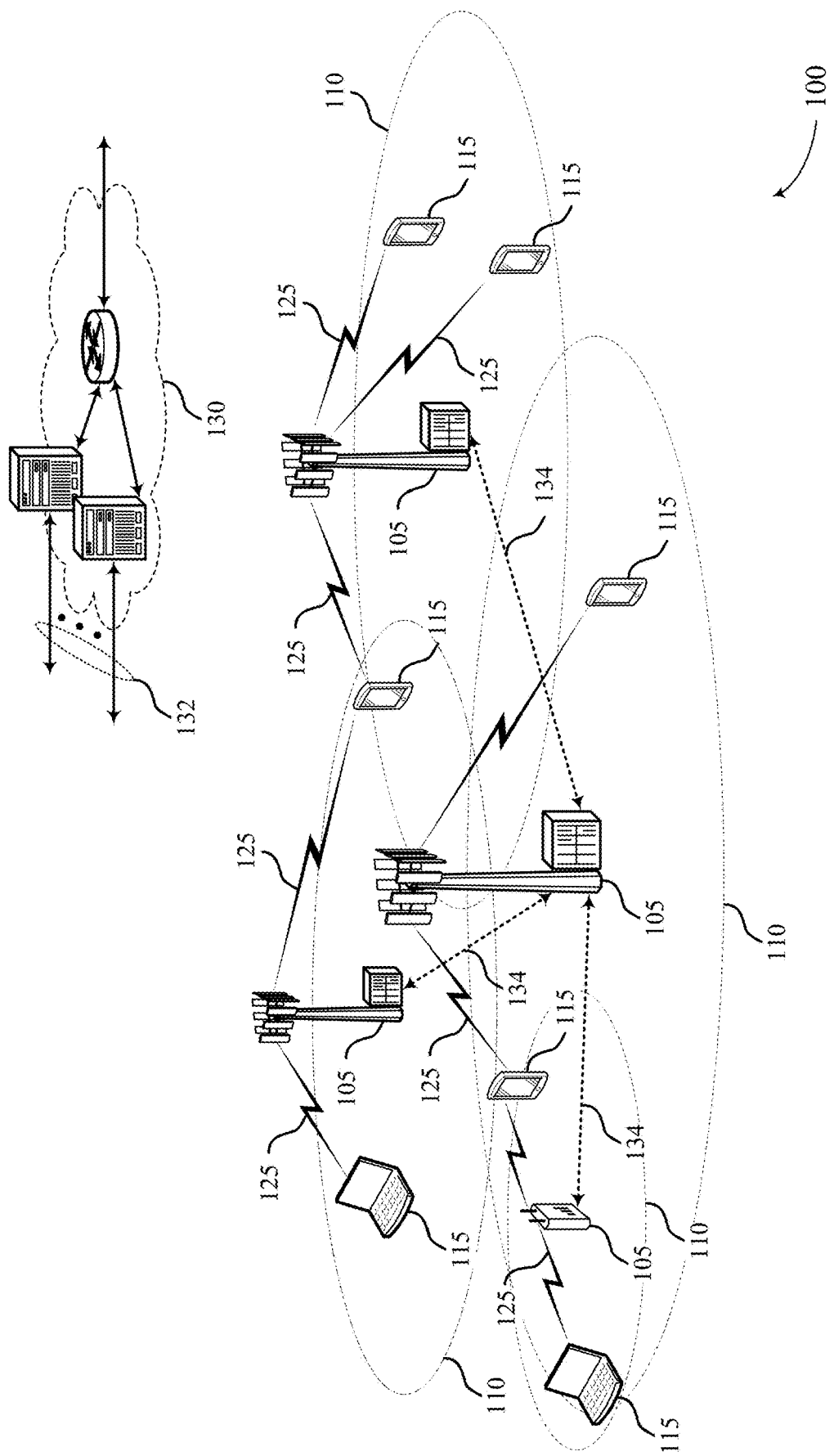
FIG. 1 illustrates an example of a system for wireless communications that supports search space activation for channel monitoring in accordance with aspects of the present disclosure.

In some wireless communications systems, a base station may transmit control information to a user equipment (UE) or a group of UEs. The UEs may use this information, which may include downlink control information (DCI), to support communications with the base station. The base station may configure search space sets with decoding candidates at one or more aggregation levels to use for these DCI transmissions. When configuring a search space set, the base station may determine a control resource set (CORESET) containing the search space set. This CORESET may include a number control channel elements (CCEs) and the search space set may be mapped to a CCE space corresponding to a subset of CCEs of the CORESET. The base station may identify decoding candidates to allocate at each aggregation level for the search space set, and may assign positions for the decoding candidates within the CCE space, for example, according to a hash function. The UEs may identify this search space set configuration, and may monitor the CCEs corresponding to the hashed decoding candidates for any DCI transmissions from the base station.

In some cases, the base stations and UEs may support ultra-reliable low latency communications services. That is, base stations and UEs may support low latency and high reliability data transmission. In such communications systems, a UE may be configured to periodically monitor search spaces with a high density of monitoring occasions. In some instances, the UE may monitor search spaces with a low density of monitoring occasions, and may switch to search spaces with a high density of monitoring occasions based on receiving an indication from the base station. For example, a base station may identify a downlink data packet for a UE, and may schedule a downlink transmission of the data packet during a following transmission. In such cases, based on receiving the downlink data, the base station may configure the UE with a high density of monitoring occasions. According to one or more aspects of the present disclosure, the base station may transmit an indication to the UE, the indication including a command to switch search space sets to monitor a different number of occasions (e.g., more occasions) or a different number of candidates (e.g., a larger number of candidates).

In some cases, a base station may implement a first search space having fewer decoding candidates than a second search space. In some cases, based on decoding the received signal (such as DCI), the UE may begin monitoring a second set of decoding candidates within the second search space. In some instances, the second search space and the first search space may be associated with the same CORESET. In some cases, the second search space and the first search space may be associated with different CORESETs. In some cases, the UE may cease to monitor the decoding candidates of the first search space, and may monitor decoding candidates of the second search space. In one example, the UE may transmit a message acknowledging the signal received within the first search space. For example, the message may include an acknowledgement of successful decoding of the DCI received in the first search space. After transmission of the acknowledgement message, the UE may cease to monitor the first search space and may begin monitoring the second search space.

In some cases, the UE may concurrently monitor the first search space and the second search space. In some cases, the UE may concurrently monitor the first search space and the second search space for a threshold duration, and may cease monitoring the first search space based on expiration of the threshold duration. In some cases, the base station may transmit a release command to the UE, and based on receiving the release command, the UE may stop monitoring the first search space and continue monitoring the second search space.

Aspects of the disclosure are initially described in the context of a wireless communications system. Aspects of the disclosure are further illustrated by and described with reference to apparatus diagrams, system diagrams, and flowcharts that relate to search space activation for channel monitoring.

FIG. 1 illustrates an example of a wireless communications system 100 that supports search space activation for channel monitoring in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may be called forward link transmissions while uplink transmissions may be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

According to one or more aspects of the present disclosure, the UE 115 may monitor a first set of decoding candidates within a first search space for receiving a physical downlink control channel message. A base station 105 may identify downlink data for the UE 115 and may transmit, to the UE 115, a signal within the first search space. The UE 115 may then receive, from the base station 105, the signal within the first search space, the signal including a command for activating a second search space. Based on receiving the signal, the UE 115 may monitor a second set of decoding candidates within the second search space, and communicate, with the base station, based on monitoring the first set of decoding candidates within the first search space and/or the second set of decoding candidates within the second search space.

Figure 2:
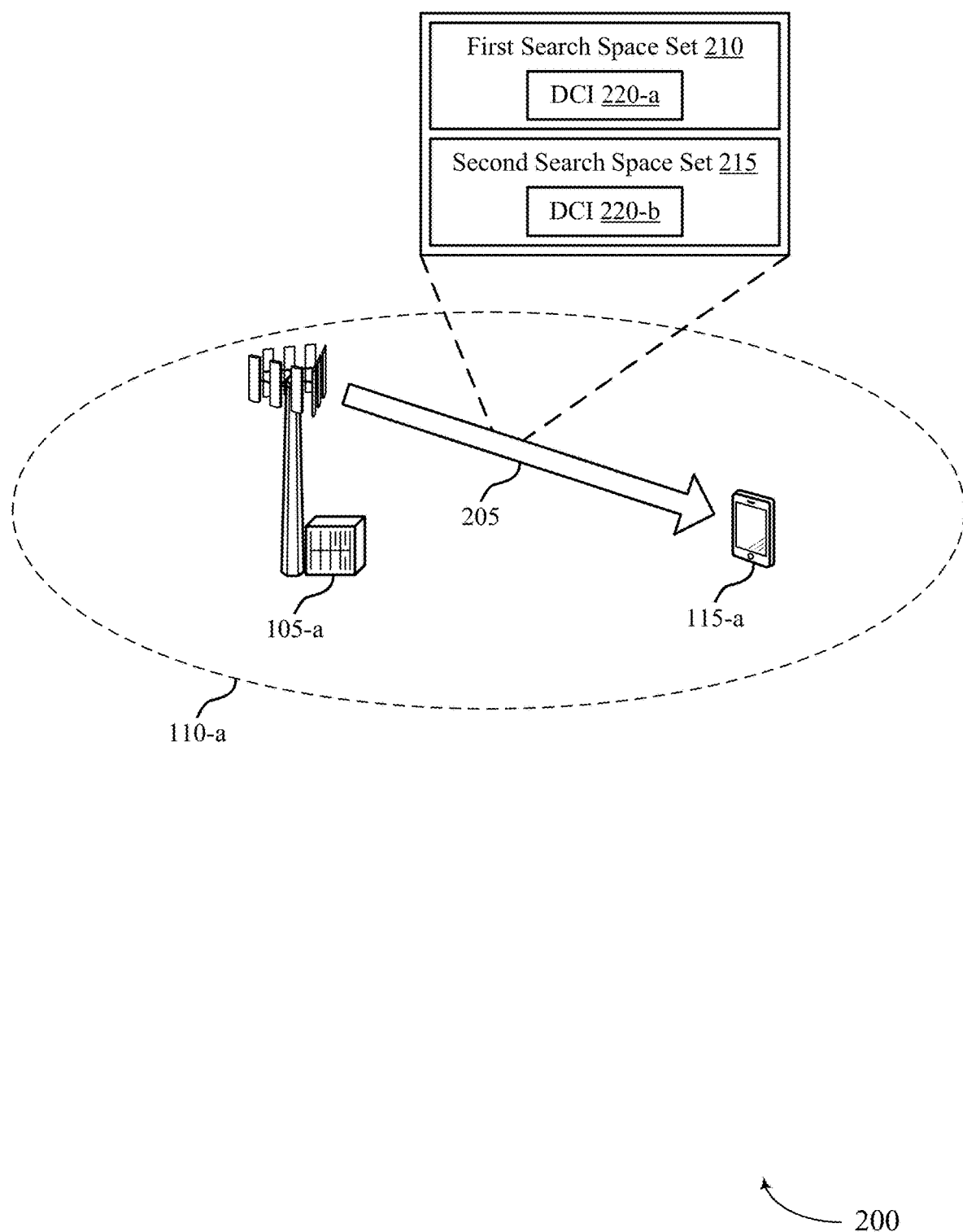
FIG. 2 illustrates an example of a wireless communications system that supports search space activation for channel monitoring in accordance with aspects of the present disclosure.

FIG. 2 illustrates an example of a wireless communications system 200 that supports search space activation for channel monitoring in accordance with aspects of the present disclosure. The wireless communications system 200 may include base station 105-*a* and UE 115-*a*, which may be examples of a base station 105 and a UE 115, as described with reference to FIG. 1. Base station 105-*a* may provide network coverage for geographic coverage area 110-*a*. Base station 105-*a* may communicate with UE 115-*a* on the downlink 205. For example, base station 105-*a* may transmit DCI 220 to UE 115-*a* in a first search space set 210 of a control channel (e.g., a physical downlink control channel), a second search space set 215 of the control channel, or both. In some cases, the first search space set may be referred to as search space A and the second search space set may be referred to as search space B. In some cases, base station 105-*a* may implement multiple first search space sets 210, second search space sets 215, or a combination thereof. UE 115-*a* may communicate with base station 105-*a* based on the received DCI 220.

In some wireless communications systems 200 (e.g., NR systems), base station 105-*a* may configure a search space set for transmission of control information (e.g., DCI 220) to UE 115-*a*. As discussed herein, a search space set may refer to a number of decoding candidates across one or more aggregation levels configured for transmission of the control information. This search space set may be contained within a set of resources, referred to as a CORESET (e.g., per bandwidth part), which may be identified based on a CORESET identifier. Additionally or alternatively, the CORESET may refer to any resources used for control information transmission within a given TTI (e.g., a slot). A CORESET may span multiple resource blocks in the frequency domain, and may span a number of orthogonal frequency division multiplexing (OFDM) symbols in the time domain. The CORESET may be divided into a number of CCEs, which may in some cases be a smallest unit of resources used for conveying control information. In some cases, a first search space set and a second search space set may be associated with different number of DCI formats and/or sizes.

Each CCE may have a number of resource elements, and may be mapped to physical resources accounting for other physical channels or reference signals transmitted in the CORESET. Each aggregation level may correspond to the number of CCEs allocated for a single DCI 220 candidate in that aggregation level. For example, an aggregation level of four may indicate that control information for that aggregation level is transmitted in multiples of four CCEs of a CORESET. This control information included within a four CCE-length segment may be referred to as a decoding candidate, a search space candidate, or simply a candidate. In some cases, the decoding candidates or the CCEs containing the decoding candidates for a given aggregation level may be referred to as a search space, and the combination of the search spaces (e.g., the combination of the decoding candidates or CCEs across the aggregation levels) may be referred to as the search space set.

According to one or more aspects of the present disclosure, a UE 115-*a* may be configured with up to three CORESETs per bandwidth part (BWP). Each CORESET can be configured to have up to three symbols. In wireless communications system 200, each CORESET may be associated with multiple search space sets. According to one example, a UE 115-*a* may be configured with up to ten search space sets in a BWP. In some cases, each search space set (such as first search space set 210 and second search space set 215) may be configured with a radio network temporary identifier (RNTI), a DCI format, an aggregation level, an aggregation length, a type of search space, a periodicity and a slot offset in the periodicity, and a 14-bit sequence for monitoring. According to one example, if a CORESET includes two symbols, then the search space set may be configured to be monitored over symbols 2-3 and 5-6 and 9-10. That is, each monitoring occasion of the search space set may include two symbols. In some cases, the same occasions may be configured to be monitored for search space set for every Z slots, where Z is the search space set periodicity.

Base stations 105-*a* and UEs 115-*a* supporting ultra-reliable low latency communications services may additionally or alternatively support low latency and high reliability data transmission. In such communications systems, a base station 105-*a* may identify a downlink data packet for a UE 115-*a*, and may schedule a downlink transmission of the data packet during the next transmission. In such systems, the base station 105-*a* may be configured to schedule the data packet with low latency to accommodate multiple retransmission opportunities. Scheduling downlink transmission of a data packet in ultra-reliable low latency communications system ensures that the reliability requirement are met, while keeping the system efficiency intact.

To schedule data transmissions in ultra-reliable low latency communications, the base station 105-*a* may configure the UE 115-*a* with high density monitoring occasions. Additionally or alternatively, the UE 115-*a* may be configured with low density monitoring occasions during a power saving mode, and with high density monitoring occasions during data transmission with higher data rate. In some cases, if a UE 115-*a* is not configured with an uplink transmission grant, the uplink transmissions may be based on scheduling requests. In such cases, when there is data for uplink transmission at the UE 115-*a*, and the UE 115-*a* does not have available and uplink resources, the UE 115-*a* may transmit a scheduling request for resources. For instance, when there is no uplink data or no pending acknowledgement process, the UE 115-*a* may not monitor an uplink DCI.

In a downlink scenario, the UE 115-*a* may not be aware of downlink data arrival, and hence, may monitor a downlink channel with a large number of candidates. In some cases, the UE 115-*a* may continuously monitor a downlink channel during a discontinuous reception (DRX) on cycle of the UE 115-*a*. In conventional systems, the ability to monitor high density monitoring occasions with large number of candidates may add to the UE complexity and power consumption. However, ultra-reliable low latency communications services may be associated with bursty traffic. In some examples, ultra-reliable low latency communications services may be associated with a high priority channel. In communications systems supporting reliable low latency communications services and a high priority channel, according to one or more aspects of the present disclosure, a UE 115-*a* may be configured to monitor search space sets with high density and having a large number of candidates during the occasions when there is data for the UE 115-*a*. That is, to reduce the workload, the base station 105-*a* may transmit an indication to the UE 115-*a* when data arrives at the base station 105-*a*. As one example, the base station 105-*a* may indicate to or command the UE 115-*a* to switch search space sets to monitor more occasions or a larger number of candidates.

In some cases, the base station 105-*a* may implement one or more search space sets 215 on a channel to support a greater number of decoding candidates than a number of decoding candidates in the one or more search space sets 210. For example, the second search space set 215 (such as search space B) may include more decoding candidates in a monitoring occasion than the first search space set 210 (such as search space A), where the first search space set 210 and the second search space set 215 have an equal number of monitoring occasions per slot. Additionally or alternatively, the second search space set 215 and the first search space set 210 may include an equal number of decoding candidates per monitoring occasion, where the second search space set 215 has more monitoring occasions per slot than the first search space set 210. In some cases, the second search space set 215 and the first search space set 210 may be associated with the same CORESET. In some cases, the second search space set 215 and the first search space set 210 may be associated with different CORESETs.

In some cases, a base station 105-a may transmit a DCI 220 (such as a signal including a DCI) within the decoding candidates for different aggregation levels on the control channel. UE 115-a may monitor the search space set of the control channel for the decoding candidates, and may detect and decode any DCI 220 transmitted in these decoding candidates. In some cases, the base station 105-a may send an indication of the search space set configuration to the UE 115-a, and the UE 115-a may determine how to monitor the channel based on this search space set configuration.

In other cases, the UE 115-a may determine the search space set configuration based on information received, implicit signaling, or a UE configuration. UE 115-a may receive and decode the DCI 220 by monitoring according to the search space set configuration. In some examples, the UE 115-a may determine UE-specific control information from the DCI 220 based on an RNTI and a parity check. For example, the UE 115-a may attempt to decode the decoding candidates using a UE-specific RNTI for the UE 115-a, and may perform a parity check on the decoded bits. If the decoded bits pass the parity check (e.g., a CRC), the UE 115-a may determine that the decoded bits correspond to control information for the UE 115-a.

In some cases, based on decoding a DCI 220, the UE 115-a may begin monitoring a first set of decoding candidates within a first search space set 210 (such as search space A) for receiving a physical downlink control channel message. The base station 105-a may identify that a downlink data for the UE 115-a is high priority data, such as ultra-reliable low latency communications data, and may transmit a command to activate the second search space set 215. In some cases, the UE 115-a may receive the activation message in a medium access layer control element. For example, the UE 115-a may receive a DCI 220 on the first search space set 210, and may then receive the medium access layer control element of a downlink channel. The medium access layer control element may indicate the activation of the second search space set 215. In some cases, the first search space set 210 (such as search space A) may include fewer decoding candidates than the second search space set 215 (such as search space B). The UE 115-a may receive a signal (such as DCI 220) within the first search space set 210, and may determine that the signal includes a command for activating a second search space. Based on decoding the DCI 220, the UE 115-a may begin monitoring a second set of decoding candidates within the second search space.

In some cases, the UE 115-a may cease to monitor the decoding candidates of the first search space set 210 (e.g., deactivate the first search space set 210), and may monitor decoding candidates of the second search space set 215 (e.g., monitor decoding candidates of the second search space set 215). In one example, the base station 105-a may transmit the activation command, but the UE 115-a may fail to receive the command. To solve this issue, in some cases, the UE 115-a may transmit a message acknowledging the signal received within the first search space set 210.

For example, the message may include an acknowledgement of successful decoding of the DCI 220 received in the first search space set 210 (such as search space A). In some cases, the message may include a HARQ-acknowledgement associated with a physical downlink shared channel scheduled by the DCI 220. After transmission of the message, the UE 115-a may cease to monitor the first search space set 210 and may begin monitoring the second search space set 215 (such as search space B). In some cases, the base station 105-a may fail to receive the message acknowledging the signal, and may continue transmission on the first search space set 210. In such cases, the UE 115-a may concurrently monitor the first search space set 210 (such as search space A) and the second search space set 215 (such as search space B). In some cases, the base station 105-a may transmit a release command to the UE 115-a. In some cases, the UE may receive the release command in a medium access layer control element. For example, the UE may receive a DCI 220 on the second search space set 215, and may then receive the release command in the medium access layer control element of a downlink channel. Based on receiving the release command, the UE 115-a may stop monitoring the first search space set 210 (such as search space A) and monitor the second search space set 215 (such as search space B). That is, the UE 115-a may deactivate the first search space set 210 and activate the second search space set 215.

In some cases, the UE 115-a may identify an index value of a location of the DCI 220. The UE 115-a may determine one or more monitoring occasions for the second search space set 215 based on the index value of the location. For example, the one or more monitoring occasions may be a function of the index value of the location where the DCI 220 is received. The UE 115-a may then monitor the second search space set 215 may be based on the determined monitoring occasions. In some cases, the UE 115-a may identify a bitmap included in the DCI 220, and may determine one or more monitoring occasions for the second search space set 215 based on the bitmap. In some cases, the bitmap may include 14 bits.

According to one or more aspects of the present disclosure, the UE 115-a may initialize a timer associated with the second search space set 215. That is, the UE 115-a may initialize the timer, when the UE 115-a receives an activation command. In some instances, the timer may be set (e.g., reset) when the UE 115-a receives a second DCI 220 on the second search space set 215. In some cases, the UE 115-a may receive a release command while monitoring the second search space set 215. Based on receiving the release command, the UE 115-a may cease monitoring the second search space set 215 and begin or continue monitoring the first search space set 210. In some cases, while monitoring the second search space set 215, the UE 115-a may receive an indication of a second signal associated with reception of downlink data within the first search space set 210. Based on receiving the second signal, the UE 115-a may cease monitoring the second search space set 215 and continue monitoring the first search space set 210.

In some cases, the UE 115-a may transmit a scheduling for an upcoming uplink transmission, and may switch from monitoring the first search space set 210 to monitoring the second search space set 215. If the base station 105-a fails to receive the scheduling request, however, the base station 105-a may continue transmissions on the first search space set 210, and the UE 115-a may be mis-aligned with the base station 105-a. To account for such a scenario, the UE 115-a may be configured to continue monitoring both the first search space set 210 and the second search space set 215 based on transmitting the scheduling request. If the UE 115-a receives downlink data on the second search space set 215, the UE 115-a may then refrain from monitoring the first search space set 210 based on the data.

In some cases, the base station 105-a may configure the UE 115-a with multiple types of the second search space set 215 (such as search space B). For example, the base station 105-a may configure the UE 115-a with a first type of second search space set (such as search space B1) and a second type of second search space set (such as search space B2). In some cases, the second type of second search space set (such as search space B2) may have more decoding candidates than the first type of second search space set (such as search space B1). If the base station 105-a determines that there is data in one direction, then the base station 105-a may activate the first type of second search space set (such as search space B1).

For example, the base station 105-a may send a DCI 220 on the first search space set 210 (such as search space A) to activate the first type of second search space set (such as search space B1). In cases where the base station 105-a determines that there is data in both directions, then the base station 105-a may activate the second type of second search space set (such as search space B2). For example, the base station 105-a may send a DCI 220 on the first search space set 210 (such as search space A) or the first type of second search space set (such as search space B1) to activate the second type of second search space set (such as search space B2).

The release indication for the first search space set 210 (such as search space A), or the different types of the second search space sets 215 (such as search space B1 and search space B2) may be based on a timer or a DCI. According to one example, if the UE monitors the second type of second search space set (such as search space B2), the UE 115-a may receive a release command from the base station 105-a. The release command may include an option to revert back to monitoring the first type of second search space set (such as search space B1) or the first search space set 210 (such as search space A). In absence of a release command, if a UE 115-a monitors the second type of second search space set (such as search space B2), and has not received a DCI in the second type of second search space set (such as search space B2) for a pre-defined amount of time, the UE 115-a may either revert back to monitoring the first type of second search space set (such as search space B1) or the first search space set 210 (such as search space A).

In one example, if the UE 115-a stops monitoring (such as deactivates) the second type of second search space set (such as search space B2) and reverts back to monitoring the first type of second search space set (such as search space B1), the UE 115-a may initialize a timer. Based on expiration of the timer, the UE 115-a may stop monitoring (such as deactivate) the first type of second search space set (such as search space B1), and may revert back to monitoring first search space set 210 (such as search space A). In some examples, the UE may revert back to monitoring the first type of second search space set (such as search space B1) upon expiration of a first timer and may revert back to monitoring the first search space set 210 (such as search space A) upon expiration of a second timer. In such an example, the first timer may be different from the second timer.

Figure 3:
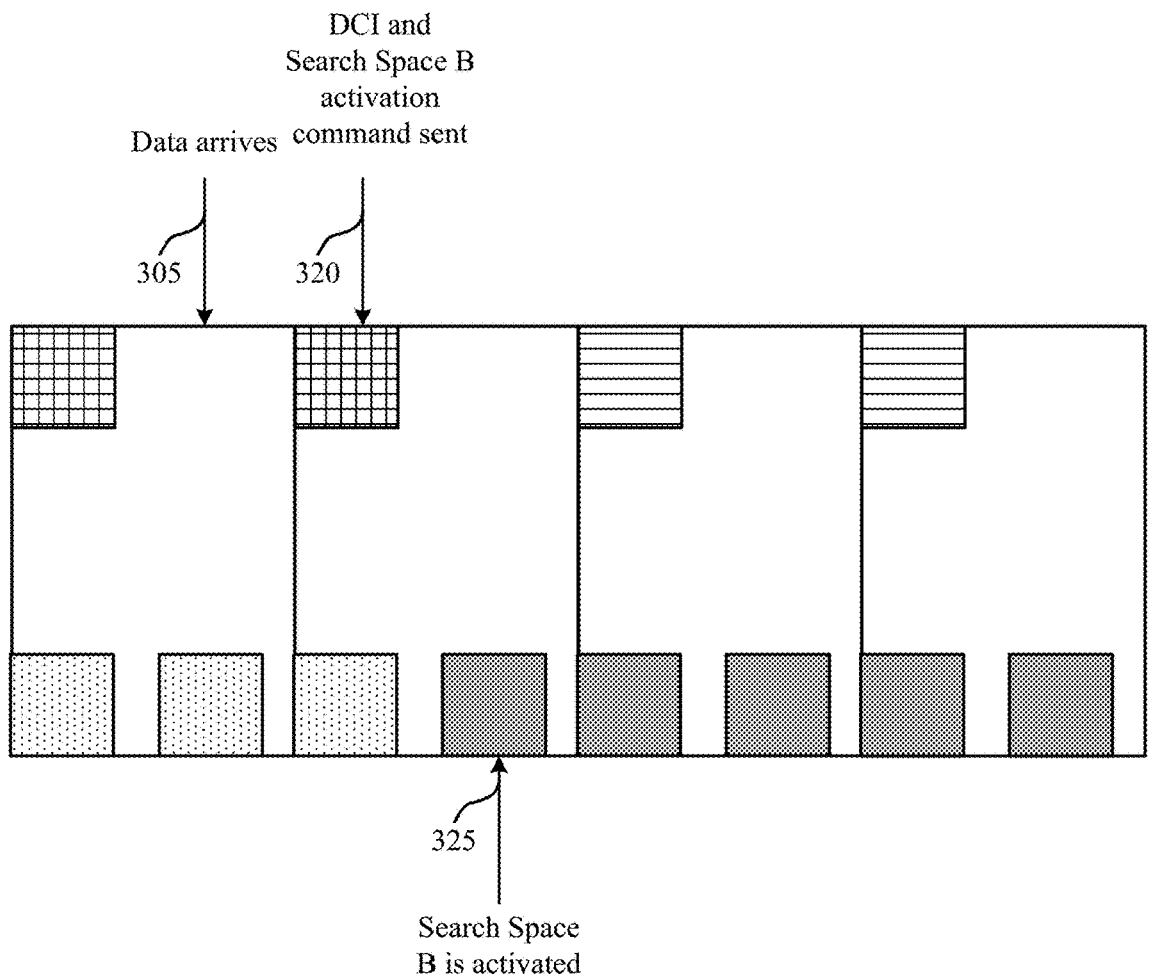
FIG. 3 illustrates an example of a search space that supports search space activation for channel monitoring in accordance with aspects of the present disclosure.

FIG. 3 illustrates an example of search space 300 that supports search space activation for channel monitoring in accordance with aspects of the present disclosure. In some examples, the search space 300 may implement aspects of wireless communications system 100 and wireless communications system 200. In the depicted example, the search space 300 may correspond to time and frequency resources, and may be divided into monitoring occasions for two search spaces, such as monitoring occasions for search space A 310 and monitoring occasions for search space B 315. Although depicted as having two search spaces (such as search space A and search space B), the search space 300 may include more search spaces (e.g., three or more) in some cases.

The search spaces, such as search space A 310 and search space B 315 may include a set of decoding candidates that may be configured for a UE (or common to multiple UEs). Across different UEs, search spaces may, in some cases may, at least partially, overlap (e.g., share some CCEs). A base station (such as base station 105) may inform the UE (such as UE 115) of an arrangement of the decoding candidates (e.g., which CCEs correspond to which decoding candidate), and transmit a control message using one or more selected CCEs. A UE may attempt to decode the CCEs corresponding to the decoding candidates to receive the control message.

In some cases, the base station may transmit information (e.g., in a master information block, in a system information block, or the like) to inform the UE of a decoding candidate arrangement that it uses. In some cases, the decoding candidate structure may indicate which CCEs within a CORESET correspond to particular aggregation level decoding candidates. Each decoding candidate may correspond to a particular CCE or group of CCEs within the CORESET. A UE may use the decoding candidate structure to identify where, and at which aggregation levels, within the search space of its CORESET to perform decoding. In the depicted example, the UE (such as UE 115) may be configured to monitor a first set of decoding candidates of a first search space (such as search space A 310).

For example, the UE may be configured to monitor one or more monitoring occasions of the first search space (such as search space A). A base station may identify that downlink data 305 for the UE has arrived. In some cases, the downlink data 305 may be high priority data, such as data associated with ultra-reliable low latency communications. Based on identifying the downlink data 305, the base station may transmit an indication 320 to the UE, the indication may include a command to switch search space sets to monitor more occasions or a larger number of candidates. In the example of FIG. 3, the indication 320 is included in a DCI. The base station may transmit the DCI including the command to switch search space during a monitoring occasion when the UE monitors the first search space 310.

As depicted in FIG. 3, the second search space 315 (such as search space B) includes more monitoring occasions than the first search space 310 (such as search space A). In some cases, the second search space 315 (such as search space B) may include more decoding candidates in a monitoring occasion than the first search space 310 (such as search space A), where the first search space 310 and the second search space 315 have an equal number of monitoring occasions per slot. In some cases, the second search space 315 and the first search space 310 may be associated with the same CORESET. In some cases, the second search space 315 and the first search space 310 may be associated with different CORESETs. In some cases, the second search space 315 and the first search space 310 may include an equal number of decoding candidates per monitoring occasion, and the second search space 315 may have more monitoring occasions per slot than the first search space 310.

The UE may receive the DCI and an indication to switch search space sets, and may activate 325 the second search space 315 (such as search space B). In some cases, based on decoding the DCI, the UE may begin monitoring a second set of decoding candidates within the second search space 315. In some cases, the UE 115-a may cease to monitor the decoding candidates of the first search space 310, and may monitor during the monitoring occasions associated with the second search space 315.

Figure 4:
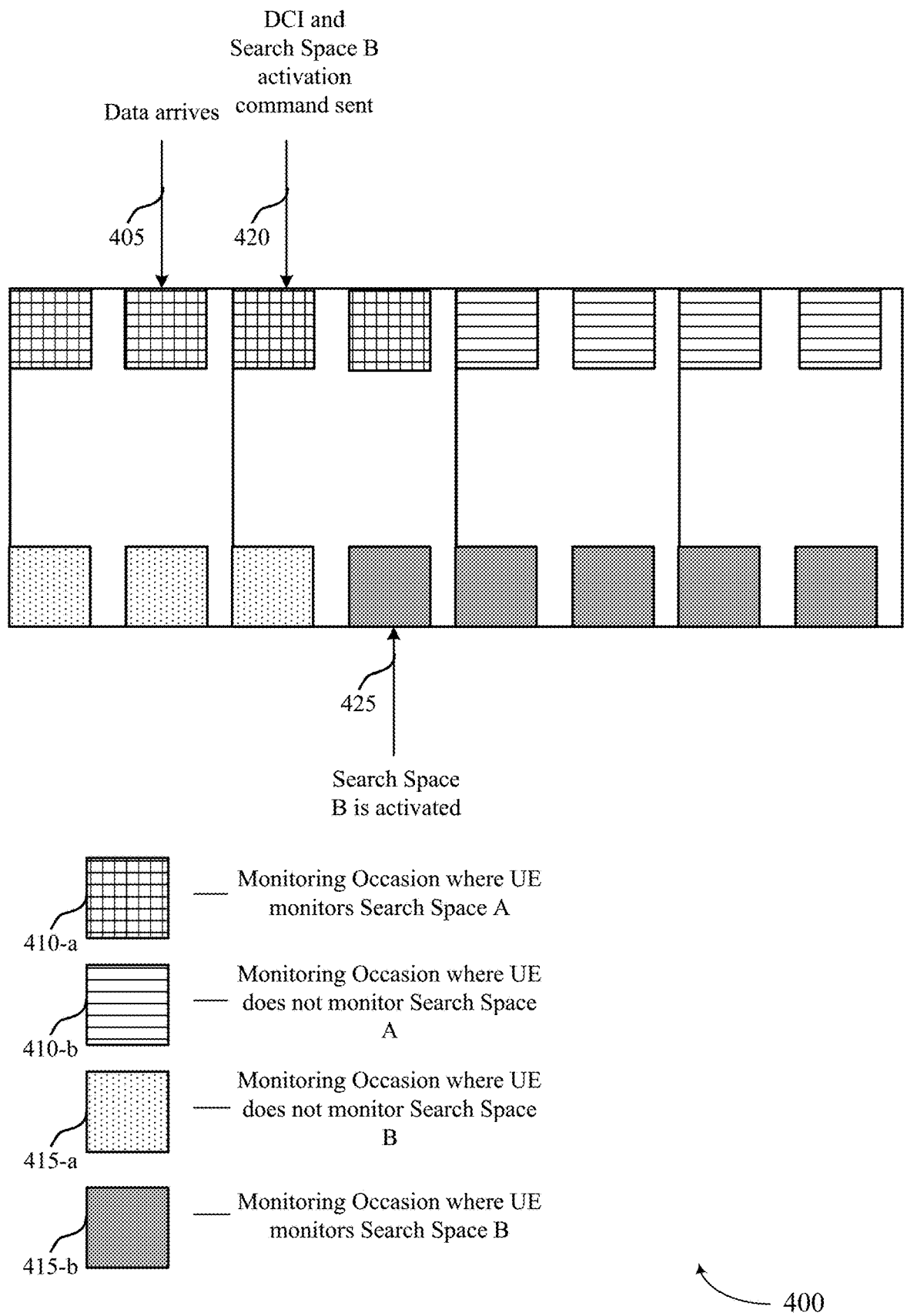
FIG. 4 illustrates an example of a search space that supports search space activation for channel monitoring in accordance with aspects of the present disclosure.

FIG. 4 illustrates an example of search space 400 that supports search space activation for channel monitoring in accordance with aspects of the present disclosure. In some examples, the search space 400 may implement aspects of wireless communications system 100 and wireless communications system 200. In the depicted example, the search space 400 may correspond to time and frequency resources, and may be divided in monitoring occasions for multiple search spaces, such as monitoring occasions for search space A 410 and monitoring occasions for search space B 415. Although depicted as having two search spaces (such as search space A and search space B), the search space 400 may include more search spaces.

As previously described with reference to FIG. 3, a base station may identify that downlink data 405 is available for the UE. In some cases, the downlink data 405 may be high priority data. In some instances, the downlink data 405 may be associated with ultra-reliable low latency communications. Based on identifying the downlink data 405, the base station may transmit an indication 420 to the UE, and the indication may be or include a command to switch search space sets. In some cases, the base station may include the indication 420 in a DCI. The DCI including the command to switch search space sets may be transmitted during a monitoring occasion when the UE monitors the first search space.

As depicted in FIG. 4, the second search space 415 (such as search space B) and the first search space 410 (such as search space A) include equal number of monitoring occasions. In some cases, the second search space 415 (such as search space B) may include more decoding candidates in a monitoring occasion than the first search space 410 (such as search space A), where the first search space 410 and the second search space 415 may have an equal number of monitoring occasions per slot.

Based on receiving the DCI and the indication 420 to switch search space sets, the UE may activate 425 the second search space 415 (such as search space B). In some cases, based on decoding the DCI, the UE may begin monitoring a second set of decoding candidates within the second search space 415. In some cases, the UE may continue monitoring the first search space 410 for a threshold duration after receiving the signal.

For example, the UE may concurrently monitor the first search space 410 and the second search space 415 for the threshold duration. The UE may then cease to monitor the first search space 410. In one example, the UE may transmit a message acknowledging the indication 420 received within the first search space 410. For example, the message may include an acknowledgement of successful decoding of the DCI and the indication 420 received in the first search space 410 (such as search space A). After transmission of the message, the UE may cease to monitor the first search space 410 and may begin monitoring the second search space 415 (such as search space B). In some cases, the base station may transmit a release command (not shown) to the UE. Based on receiving the release command, the UE may stop monitoring the first search space 410 (such as search space A) and may monitor the second search space 415 (such as search space B).

Figure 5:
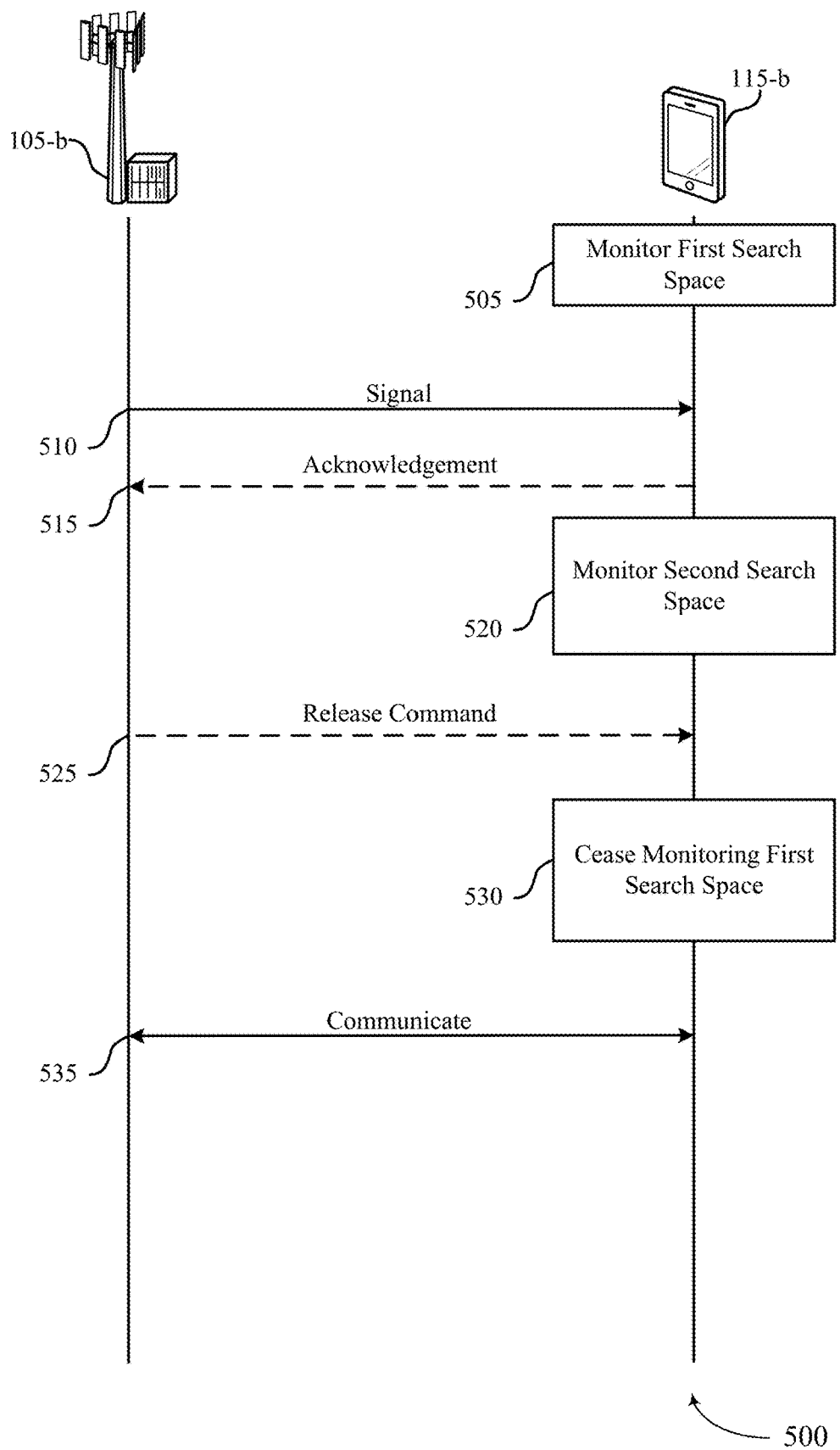
FIG. 5 illustrates an example of a process flow that supports search space activation for channel monitoring in accordance with aspects of the present disclosure.

FIG. 5 illustrates an example of a process flow 500 that supports search space activation for channel monitoring in accordance with aspects of the present disclosure. In some examples, process flow 500 may implement aspects of wireless communications system 100 and wireless communications system 200. Base stations 105-b and UE 115-b, may be examples of the corresponding devices described with reference to FIGS. 1 and 2. In some examples, the process flow 500 may implement aspects or features of the search space 300 and the search space 400 as described with reference to FIGS. 3 and 4.

In the following description of the process flow 500, the operations between UE 115-b and base station 105-b may be transmitted in a different order than the exemplary order shown. The operations performed by UE 115-b or base station 105-b may be performed in different orders or at different times than the exemplary order shown. Some operations may also be omitted from the process flow 500, or other operations may be added to the process flow 500. Further, base station 105-b and UE 115-b are not limiting, as the described features may be associated with any number of different devices.

At 505, UE 115-b may monitor a first set of decoding candidates within a first search space for receiving a physical downlink control channel message. For example, the UE 115-b may monitor the decoding candidates of search space A. In some cases, the physical downlink control channel message may be associated with ultra-reliable low latency communications.

At 510, base station 105-b may transmit a signal within the first search space. According to some instances, the signal may include a command for activating a second search space. In some cases, the signal may be included in a DCI. In some cases, the signal may include 2 bits.

At 515, UE 115-b may optionally transmit a message acknowledging the signal received within the first search space. For example, the UE 115-b may decode the signal and may transmit an acknowledgement acknowledging the successful decoding. In some cases, the message may include a HARQ-acknowledgement associated with a physical downlink shared channel scheduled by the signal.

At 520, UE 115-b may monitor a second set of decoding candidates within the second search space based on receiving the signal. In some cases, the monitoring may be based on the transmitted message. In some cases, a first periodicity associated with the first set of decoding candidates within the first search space may be greater than a second periodicity associated with the second set of decoding candidates within the second search space.

In some cases, the second search space may include more decoding candidates in a monitoring occasion than the first search space, where the first search space and the second search space may have an equal number of monitoring occasions per slot. Alternatively, the second search space and the first search space may include an equal number of decoding candidates in the monitoring occasion, where the second search space may have more monitoring occasions per slot than the second search space.

At 525, base station 105-b may optionally transmit a second signal within the first search space. In some cases, the second signal may include a command for releasing the first search space. At 530, UE 115-b may cease monitoring the first set of decoding candidates within the first search space. In some cases, ceasing monitoring the first set of decoding candidates within the first search space may be based on receiving the signal. In some cases, before ceasing monitoring the first set of decoding candidates within the first search space, UE 115-*b* may concurrently monitor the first set of decoding candidates within the first search space and the second set of decoding candidates within the second search space.

At 535, UE 115-*b* may communicate, with base station 105-*b* and/or other devices, based on monitoring the first set of decoding candidates within the first search space and the second set of decoding candidates within the second search space.

The operations performed by the base station 105-*b* and the UE 115-*b* as part of, but not limited to, process flow 500 may provide improvements to communication links in wireless communications systems. Furthermore, the operations performed by the base station 105-*b* and the UE 115-*b* as part of, but not limited to, process flow 500 may provide benefits and enhancements to the operation of the UE 115-*b* while performing communications having a high reliability and low latency. For example, the described methods in the process flow 500 may support search space activation for channel monitoring, among other advantages.

Figure 6:
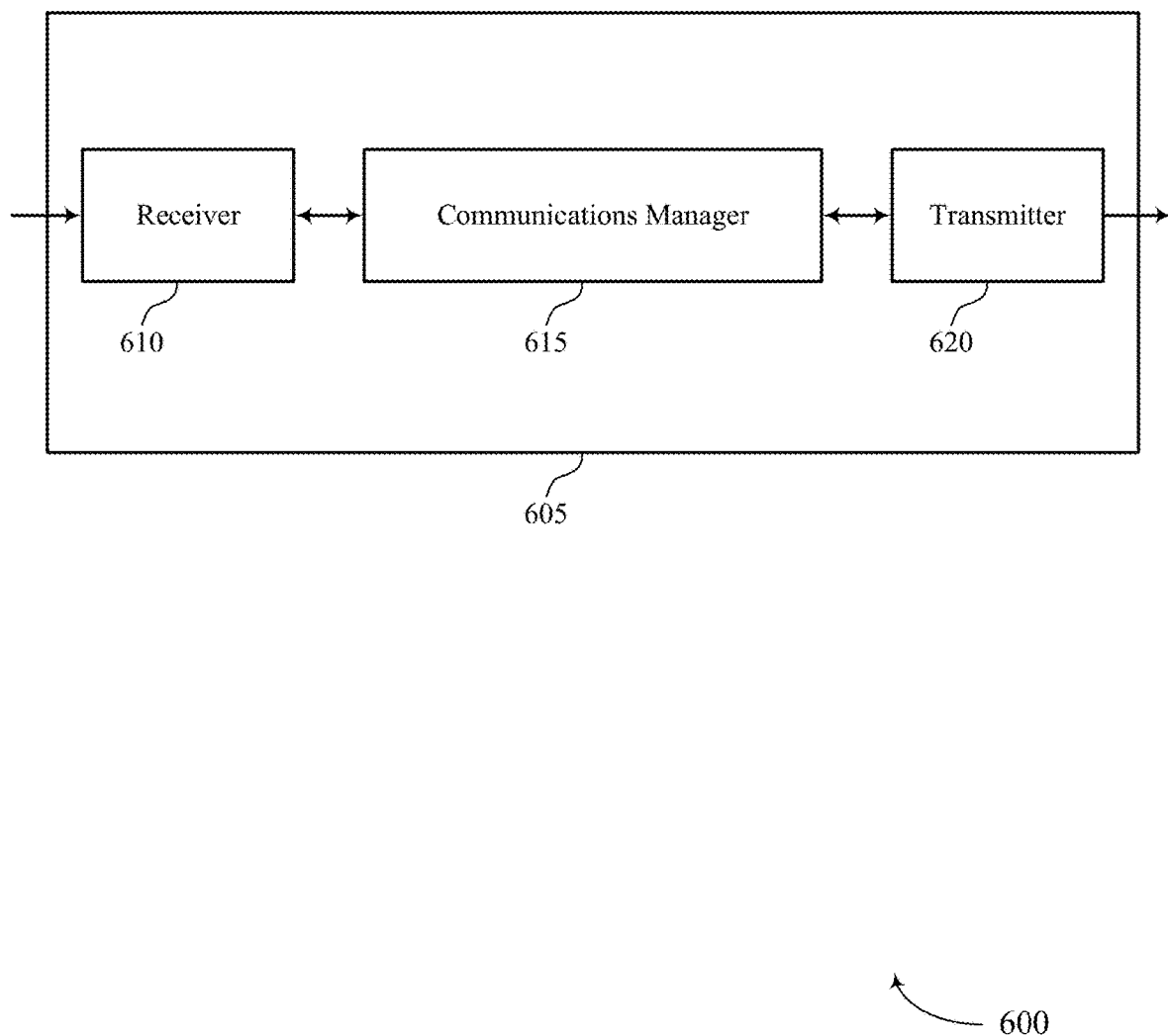
FIGS. 6 and 7 show block diagrams of devices that support search space activation for channel monitoring in accordance with aspects of the present disclosure.

FIG. 6 shows a block diagram 600 of a device 605 that supports search space activation for channel monitoring in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to search space activation for channel monitoring, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor a first set of decoding candidates within a first search space for receiving a physical downlink control channel message, and may monitor a second set of decoding candidates within the second search space based on receiving the signal. The communications manager 615 may receive, from a base station, a signal within the first search space, the signal including a command for activating a second search space, and communicate, with the base station, based on monitoring the first set of decoding candidates within the first search space and the second set of decoding candidates within the second search space. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
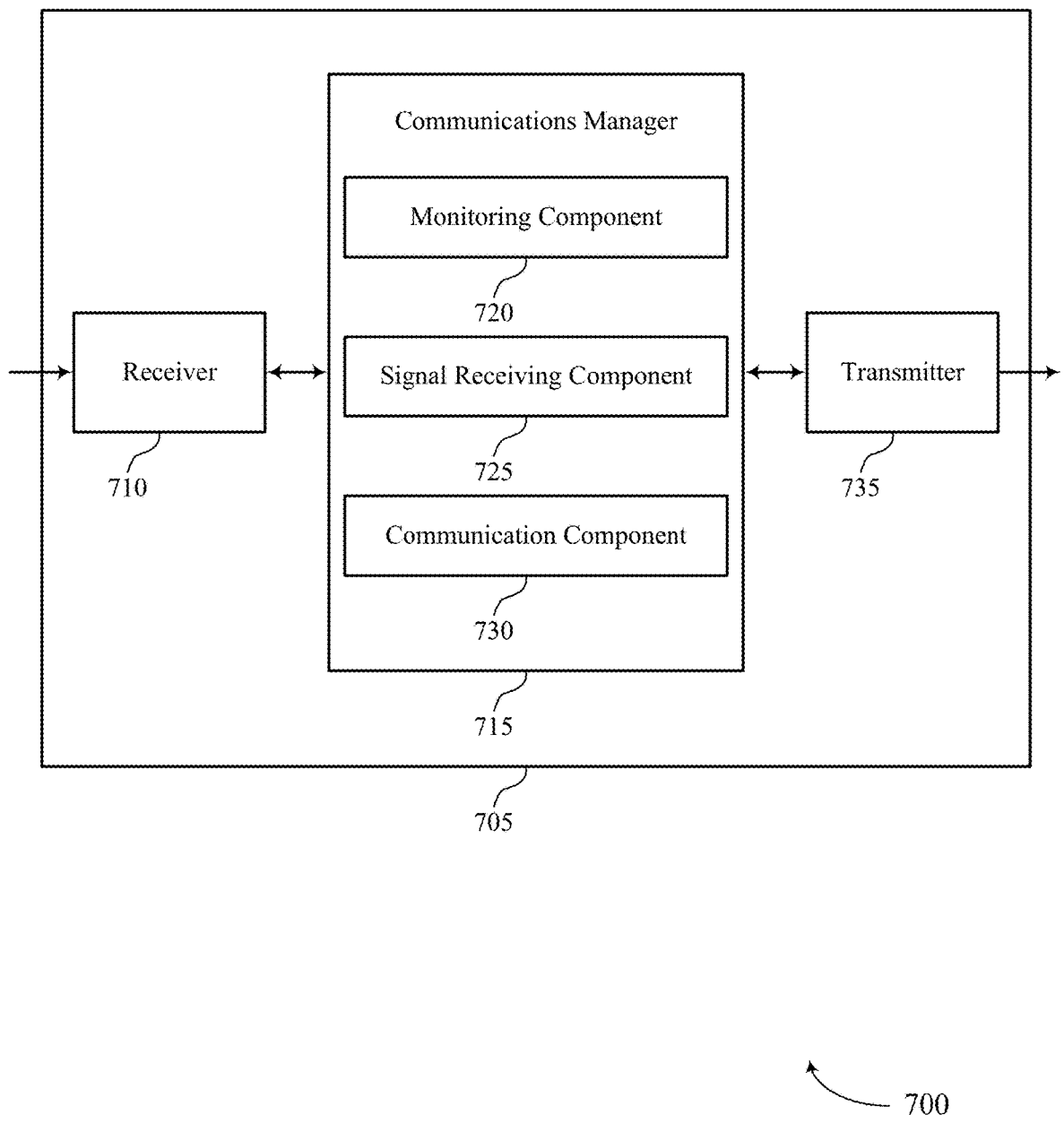

FIG. 7 shows a block diagram 700 of a device 705 that supports search space activation for channel monitoring in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to search space activation for channel monitoring, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a monitoring component 720, a signal receiving component 725, and a communication component 730. The communications manager 715 may be an example of aspects of the communications manager 910 described herein.

The monitoring component 720 may monitor a first set of decoding candidates within a first search space for receiving a physical downlink control channel message and monitor a second set of decoding candidates within the second search space based on receiving the signal. The signal receiving component 725 may receive, from a base station, a signal within the first search space, the signal including a command for activating a second search space. The communication component 730 may communicate, with the base station, based on monitoring the first set of decoding candidates within the first search space and the second set of decoding candidates within the second search space.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

The actions performed by the communications manager 715 as described herein may be implemented to realize one or more potential advantages. For example, In some examples, the communications manager 715 may decrease communication latency and enhance channel throughput for high-reliability communications. The improvements in the communication link (for example, decreasing communication latency and increasing reliability) may further save power and increase battery life at a UE 115 (for example, by reducing complexity and retransmissions).

Figure 8:
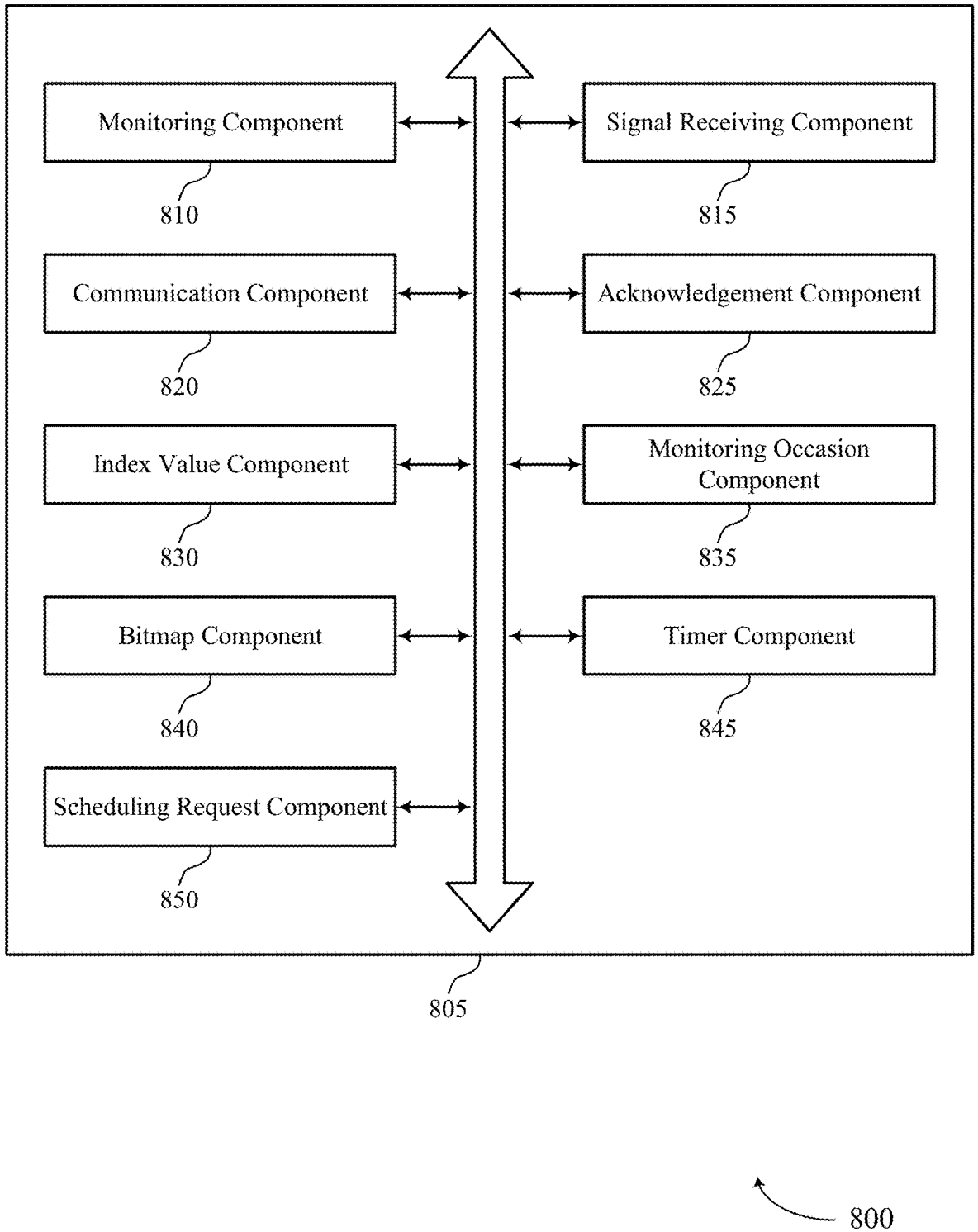
FIG. 8 shows a block diagram of a communications manager that supports search space activation for channel monitoring in accordance with aspects of the present disclosure.

FIG. 8 shows a block diagram 800 of a communications manager 805 that supports search space activation for channel monitoring in accordance with aspects of the present disclosure. The communications manager 805 may be an example of aspects of a communications manager 615, a communications manager 715, or a communications manager 910 described herein. The communications manager 805 may include a monitoring component 810, a signal receiving component 815, a communication component 820, an acknowledgement component 825, an index value component 830, a monitoring occasion component 835, a bitmap component 840, a timer component 845, and a scheduling request component 850. Each of these modules may communicate, directly or indirectly, with one another (e.g., via one or more buses).

The monitoring component 810 may monitor a first set of decoding candidates within a first search space for receiving a physical downlink control channel message. In some examples, the monitoring component 810 may monitor a second set of decoding candidates within the second search space based on receiving a signal. In some cases, the physical downlink control channel message is associated with ultra-reliable low latency communications. In some cases, a first periodicity associated with the first set of decoding candidates within the first search space is greater than a second periodicity associated with the second set of decoding candidates within the second search space.

In some examples, the monitoring component 810 may monitor the first set of decoding candidates within the first search space and the second set of decoding candidates within the second search space, concurrently. In some examples, the monitoring component 810 may monitor the first set of decoding candidates within the first search space for a threshold duration after receiving the signal, where monitoring the second set of decoding candidates within the second search space occurs after expiration of the threshold duration.

In some examples, the monitoring component 810 may cease monitoring the first set of decoding candidates within the first search space based on receiving the signal. In some examples, the monitoring component 810 may cease monitoring the second set of decoding candidates within the second search space based on expiration of the timer. In some examples, the monitoring component 810 may cease monitoring the second set of decoding candidates within the second search space based on receiving the second signal.

In some examples, the monitoring component 810 may monitor a third set of decoding candidates within the third search space based on receiving the second signal. In some examples, the monitoring component 810 may monitor the second set of decoding candidates within the second search space based on receiving the third signal. In some examples, the monitoring component 810 may monitor the first set of decoding candidates within the first search space based on receiving the third signal.

In some examples, the monitoring component 810 may monitor the second set of decoding candidates within the second search space based on expiration of the first timer. In some examples, the monitoring component 810 may monitor the first set of decoding candidates within the first search space based on expiration of the second timer. In some cases, the third set of decoding candidates within the third search space is greater than the second set of decoding candidates within the second search space. In some cases, one or more monitoring occasions for the third search space is greater than one or more monitoring occasions for the second search space. In some cases, the third set of decoding candidates within the third search space is associated with bi-directional data transmission.

In some cases, the second search space includes more decoding candidates in a monitoring occasion than the first search space, the first search space and the second search space having an equal number of monitoring occasions per slot, or the second search space and the first search space include an equal number of decoding candidates in the monitoring occasion, the second search space having more monitoring occasions per slot than the first search space, or a combination thereof.

The signal receiving component 815 may receive, from a base station, a signal within the first search space, the signal including a command for activating a second search space. In some cases, the signal includes a downlink control indicator. In some examples, the signal receiving component 815 may receive, from the base station, a second signal within the first search space, the second signal including a command for releasing the first search space, where monitoring the second set of decoding candidates within the second search space is based on receiving the second signal. In some cases, the second signal is included in a downlink control indicator. In some cases, the command for activating the second search space includes 2 bits.

In some examples, the signal receiving component 815 may receive, from the base station, a second signal associated with reception of downlink data within the second search space. In some examples, the signal receiving component 815 may receive, from the base station, a second signal within the second search space, the second signal including a command for releasing the second search space. In some examples, the signal receiving component 815 may receive, from the base station, a second signal associated with reception of downlink data within the first search space.

In some examples, the signal receiving component 815 may receive, from the base station, a second signal within the second search space, the second signal including a command for activating a third search space. In some examples, the signal receiving component 815 may receive, from the base station, a third signal within the third search space, the third signal including a command for releasing the third search space and reverting back to the second search space. In some examples, the signal receiving component 815 may receive, from the base station, a third signal within the third search space, the third signal including a command for releasing the third search space and reverting back to the first search space.

The communication component 820 may communicate, with the base station, based on monitoring the first set of decoding candidates within the first search space and the second set of decoding candidates within the second search space. The acknowledgement component 825 may transmit a message acknowledging the signal received within the first search space, where monitoring the second set of decoding candidates within the second search space is based on transmitting the message.

The index value component 830 may identify an index value of a location of the downlink control indicator. The monitoring occasion component 835 may determine one or more monitoring occasions for the second search space based on the index value of the location, where monitoring the second set of decoding candidates is based on the one or more monitoring occasions.

The bitmap component 840 may identify a bitmap included in the downlink control indicator. In some examples, the monitoring occasion component 835 may determine one or more monitoring occasions for the second search space based on the bitmap, where monitoring the second set of decoding candidates is based on the one or more monitoring occasions. In some cases, the bitmap includes 14 bits.

The timer component 845 may initialize a timer associated with the second search space based on receiving the signal, where monitoring the second set of decoding candidates within the second search space is based on the timer. In some examples, the timer component 845 may initialize a timer associated with the second search space based on receiving the signal. In some examples, the timer component 845 may reinitialize the timer associated with the second search space based on receiving the second signal, where monitoring the second set of decoding candidates within the second search space is based on the timer.

In some examples, the timer component 845 may initialize a first timer associated with the third search space based on receiving the second signal. In some examples, the timer component 845 may initialize a second timer associated with the second search space based on monitoring the second set of decoding candidates within the second search space.

The scheduling request component 850 may transmit, to the base station, a scheduling request for an upcoming uplink transmission, where monitoring the second set of decoding candidates within the second search space is based on transmitting the scheduling request.

Figure 9:
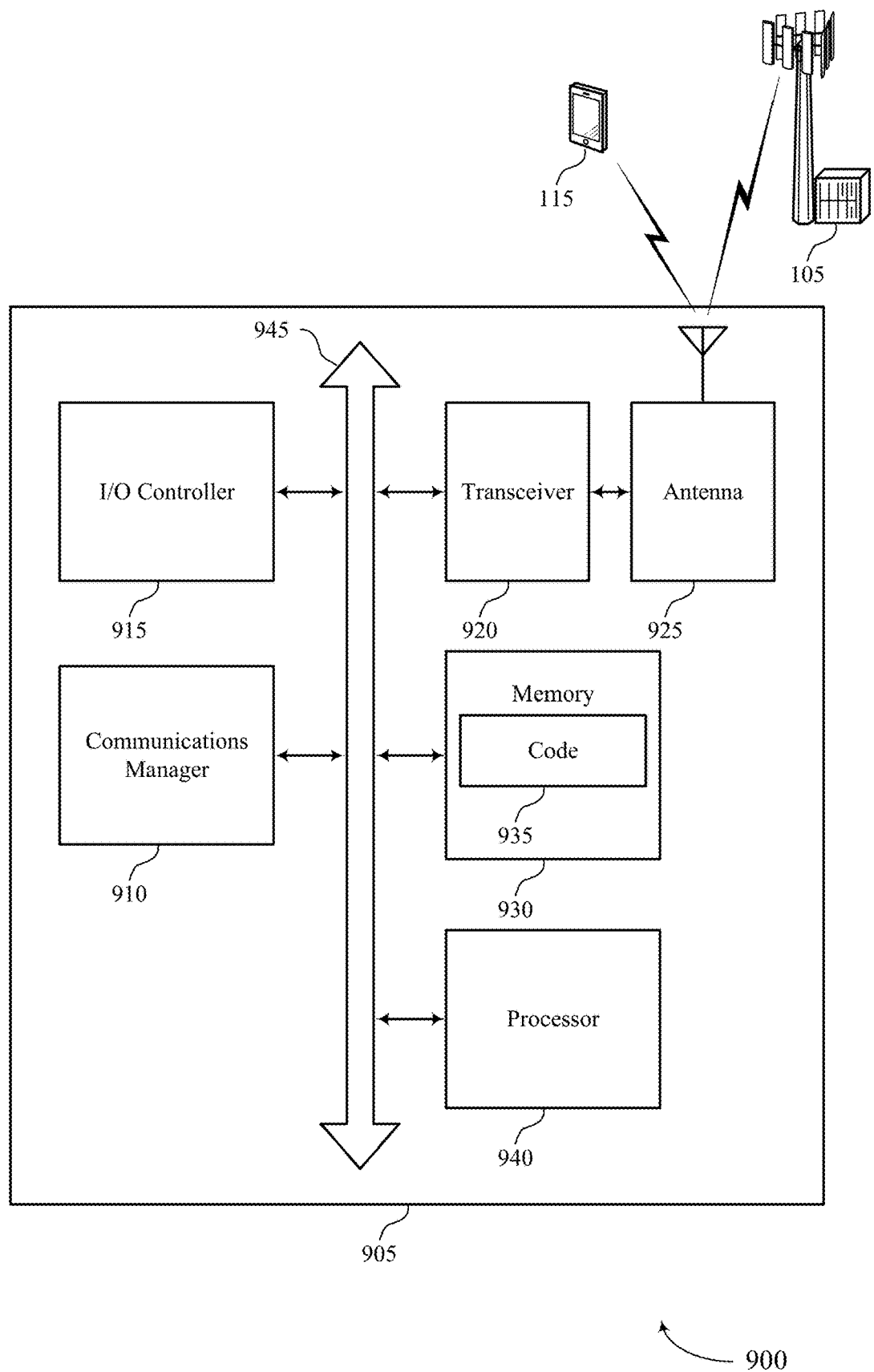
FIG. 9 shows a diagram of a system including a device that supports search space activation for channel monitoring in accordance with aspects of the present disclosure.

FIG. 9 shows a diagram of a system 900 including a device 905 that supports search space activation for channel monitoring in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor a first set of decoding candidates within a first search space for receiving a physical downlink control channel message and may monitor a second set of decoding candidates within the second search space based on receiving the signal. The communications manager 910 may receive, from a base station, a signal within the first search space, the signal including a command for activating a second search space, and communicate, with the base station, based on monitoring the first set of decoding candidates within the first search space and the second set of decoding candidates within the second search space.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting search space activation for channel monitoring).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
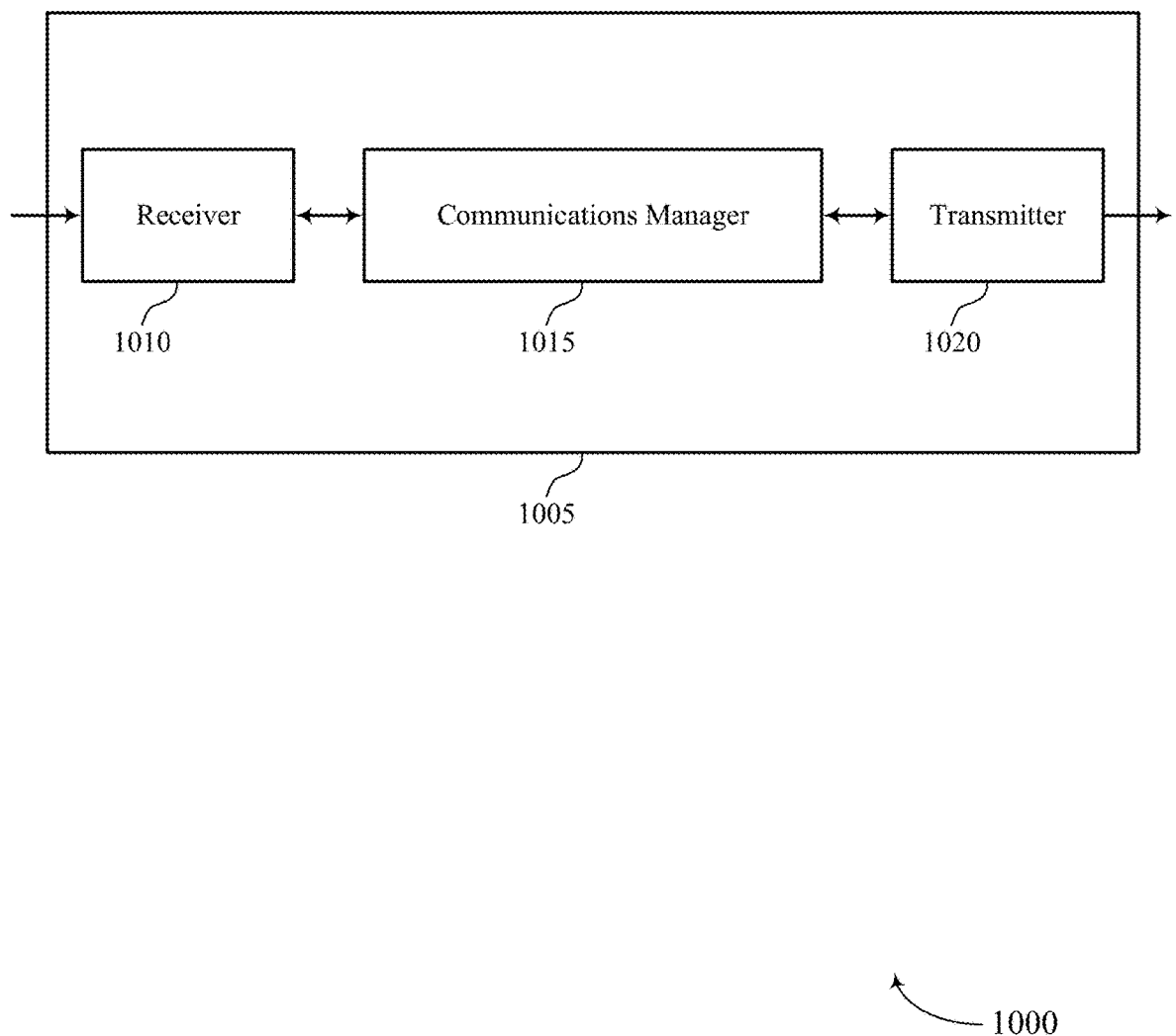
FIGS. 10 and 11 show block diagrams of devices that support search space activation for channel monitoring in accordance with aspects of the present disclosure.

FIG. 10 shows a block diagram 1000 of a device 1005 that supports search space activation for channel monitoring in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to search space activation for channel monitoring, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify downlink data for a UE configured to monitor a first set of decoding candidates within a first search space, transmit, to the UE based on the downlink data, a signal within the first search space, the signal including a command for activating a second search space associated with a second set of decoding candidates, and communicate, with the UE, based on transmitting the signal within the first search space. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
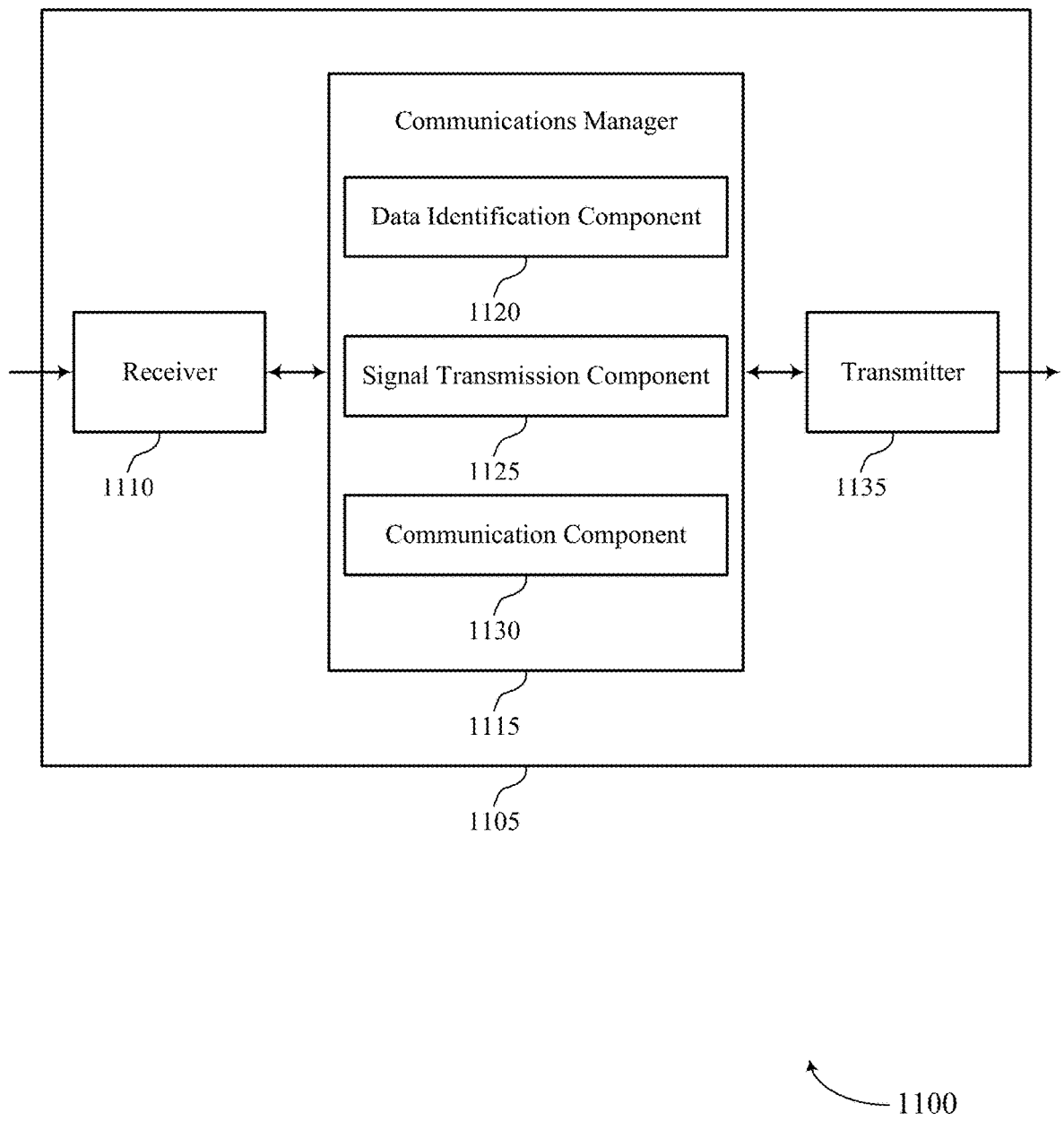

FIG. 11 shows a block diagram 1100 of a device 1105 that supports search space activation for channel monitoring in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to search space activation for channel monitoring, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a data identification component 1120, a signal transmission component 1125, and a communication component 1130. The communications manager 1115 may be an example of aspects of the communications manager 1310 described herein.

The data identification component 1120 may identify downlink data for a UE configured to monitor a first set of decoding candidates within a first search space. The signal transmission component 1125 may transmit, to the UE based on the downlink data, a signal within the first search space, the signal including a command for activating a second search space associated with a second set of decoding candidates. The communication component 1130 may communicate, with the UE, based on transmitting the signal within the first search space.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
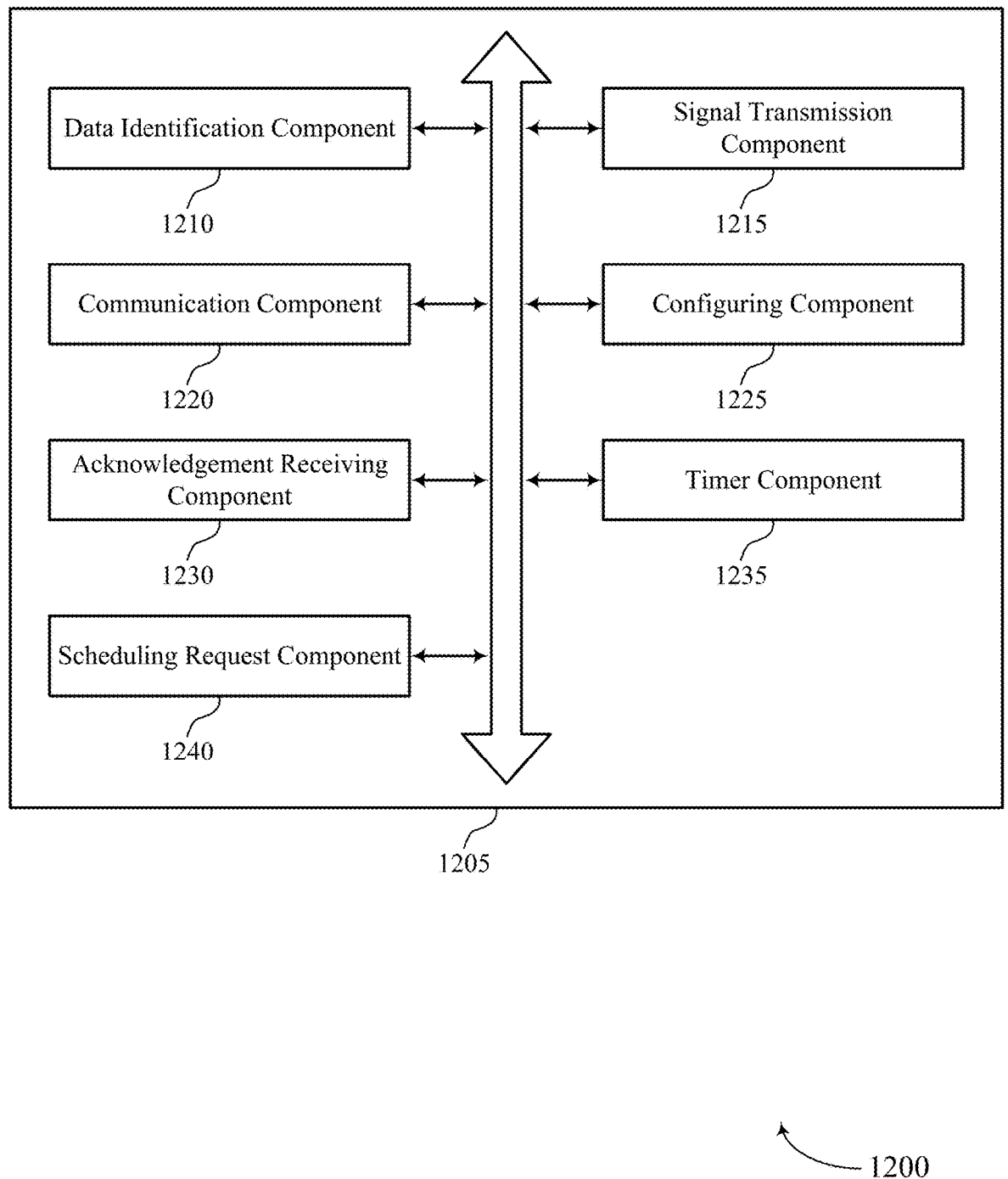
FIG. 12 shows a block diagram of a communications manager that supports search space activation for channel monitoring in accordance with aspects of the present disclosure.

FIG. 12 shows a block diagram 1200 of a communications manager 1205 that supports search space activation for channel monitoring in accordance with aspects of the present disclosure. The communications manager 1205 may be an example of aspects of a communications manager 1015, a communications manager 1115, or a communications manager 1310 described herein. The communications manager 1205 may include a data identification component 1210, a signal transmission component 1215, a communication component 1220, a configuring component 1225, an acknowledgement receiving component 1230, a timer component 1235, and a scheduling request component 1240. Each of these modules may communicate, directly or indirectly, with one another (e.g., via one or more buses).

The data identification component 1210 may identify downlink data for a UE configured to monitor a first set of decoding candidates within a first search space. In some cases, the downlink data is associated with ultra-reliable low latency communications. The signal transmission component 1215 may transmit, to the UE based on the downlink data, a signal within the first search space, the signal including a command for activating a second search space associated with a second set of decoding candidates.

In some examples, the signal transmission component 1215 may transmit, to the UE, a second signal within the first search space, the second signal including a command for releasing the first search space. In some examples, the signal transmission component 1215 may transmit, to the UE, a second signal associated with transmission of downlink data within the second search space. In some cases, the signal includes a downlink control indicator. In some cases, the second signal is included in a downlink control indicator. In some cases, the command for activating the second search space includes 2 bits.

In some examples, the signal transmission component 1215 may transmit, to the UE, a second signal within the second search space, the second signal including a command for releasing the second search space. In some examples, the signal transmission component 1215 may transmit, to the UE, a second signal associated with transmission of downlink data within the first search space. In some examples, the signal transmission component 1215 may transmit, to the UE, a second signal within the second search space, the second signal including a command for activating a third search space associated with a third set of decoding candidates.

In some examples, the signal transmission component 1215 may transmit, to the UE, a third signal within the third search space, the third signal including a command for releasing the third search space and reverting back to the second search space. In some examples, the signal transmission component 1215 may transmit, to the UE, a third signal within the third search space, the third signal including a command for releasing the third search space and reverting back to the first search space. In some cases, the third set of decoding candidates within the third search space is greater than the second set of decoding candidates within the second search space. In some cases, one or more monitoring occasions for the third search space is greater than one or more monitoring occasions for the second search space. In some cases, the third set of decoding candidates within the third search space is associated with bi-directional data transmission.

The communication component 1220 may communicate, with the UE, based on transmitting the signal within the first search space. The configuring component 1225 may configure the UE to monitor the second set of decoding candidates within the second search space based on transmitting the signal. In some examples, the configuring component 1225 may configure the UE to concurrently monitor the first set of decoding candidates within the first search space and the second set of decoding candidates within the second search space. In some examples, the configuring component 1225 may configure the UE to monitor the first set of decoding candidates within the first search space for a threshold duration after transmitting the signal.

In some examples, the configuring component 1225 may configure the UE to monitor the second set of decoding candidates within the second search space after expiration of the threshold duration. In some examples, the configuring component 1225 may configure the UE to monitor the second set of decoding candidates within the second search space based on transmitting the second signal. In some examples, the configuring component 1225 may configure the UE to cease monitoring the first set of decoding candidates within the first search space based on transmitting the signal.

In some examples, the configuring component 1225 may configure the UE to monitor the second set of decoding candidates within the second search space based on the timer. In some examples, the configuring component 1225 may configure the UE to monitor the second set of decoding candidates within the second search space is based on the timer. In some examples, the configuring component 1225 may configure the UE to cease monitoring the second set of decoding candidates within the second search space based on expiration of the timer.

In some examples, the configuring component 1225 may configure the UE to cease monitoring the second set of decoding candidates within the second search space based on transmitting the second signal. In some examples, the configuring component 1225 may configure the UE to monitor the second set of decoding candidates within the second search space based on receiving the scheduling request. In some examples, the configuring component 1225 may configure the UE to monitor the second set of decoding candidates within the second search space based on expiration of the first timer.

In some examples, the configuring component 1225 may configure the UE to monitor the first set of decoding candidates within the first search space based on expiration of the second timer. In some cases, a first periodicity associated with the first set of decoding candidates within the first search space is greater than a second periodicity associated with the second set of decoding candidates within the second search space. In some cases, the second search space includes more decoding candidates in a monitoring occasion than the first search space, the first search space and the second search space having an equal number of monitoring occasions per slot, or the second search space and the first search space include an equal number of decoding candidates in the monitoring occasion, the second search space having more monitoring occasions per slot than the first search space, or a combination thereof.

The acknowledgement receiving component 1230 may receive, from the UE, a message acknowledging the signal transmitted within the first search space. The timer component 1235 may configure the UE to initialize a timer associated with the second search space based on transmitting the signal. In some examples, the timer component 1235 may configure the UE to initialize a timer associated with the second search space based on transmitting the signal. In some examples, the timer component 1235 may configure the UE to reinitialize the timer associated with the second search space based on transmitting the second signal.

In some examples, the timer component 1235 may configure the UE to initialize a first timer associated with the third search space based on transmitting the second signal. In some examples, the timer component 1235 may configure the UE to initialize a second timer associated with the second search space based on monitoring the second set of decoding candidates within the second search space. The scheduling request component 1240 may receive, from the UE, a scheduling request for an uplink transmission.

Figure 13:
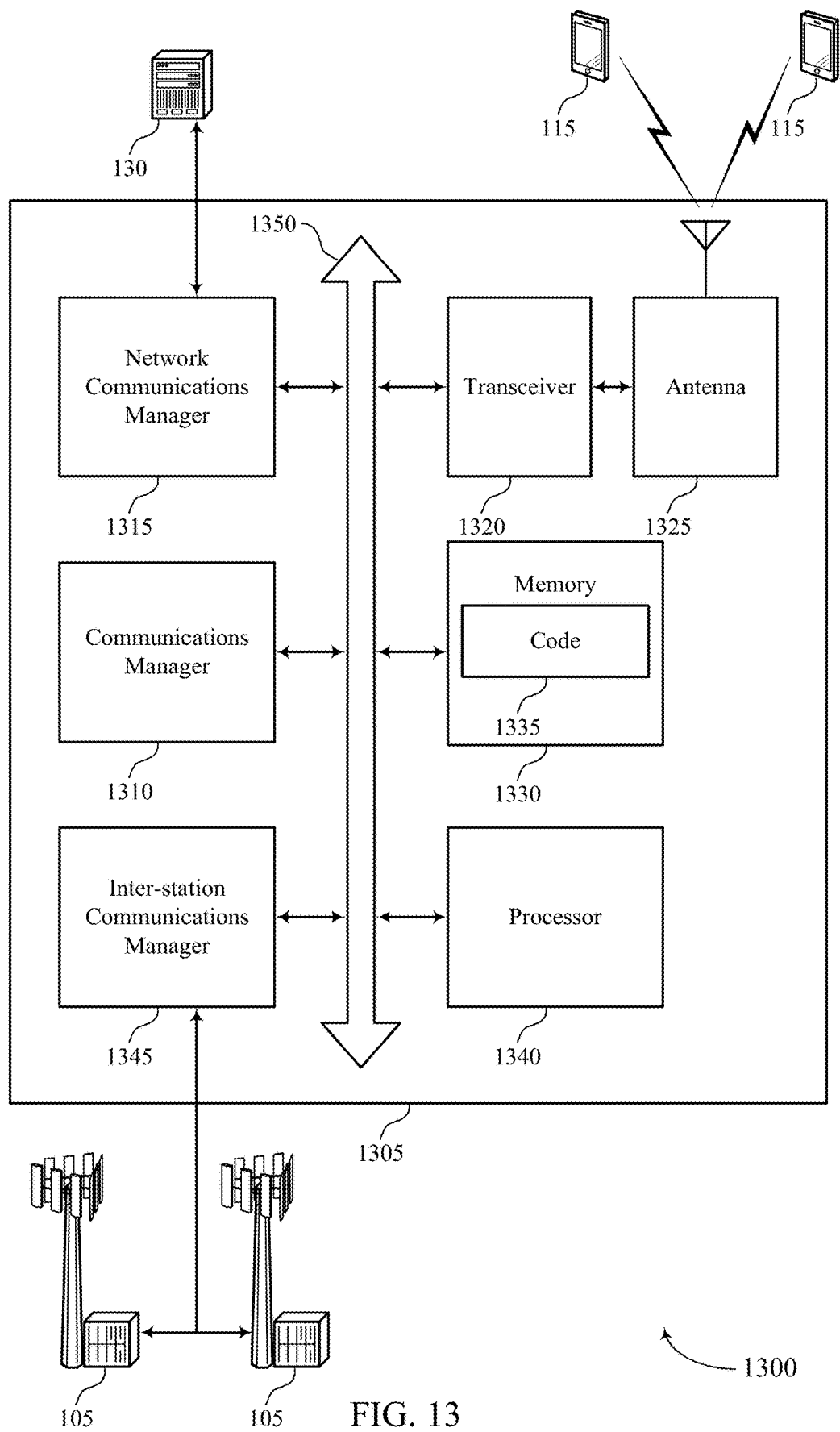
FIG. 13 shows a diagram of a system including a device that supports search space activation for channel monitoring in accordance with aspects of the present disclosure.

FIG. 13 shows a diagram of a system 1300 including a device 1305 that supports search space activation for channel monitoring in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify downlink data for a UE configured to monitor a first set of decoding candidates within a first search space, transmit, to the UE based on the downlink data, a signal within the first search space, the signal including a command for activating a second search space associated with a second set of decoding candidates, and communicate, with the UE, based on transmitting the signal within the first search space.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting search space activation for channel monitoring).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
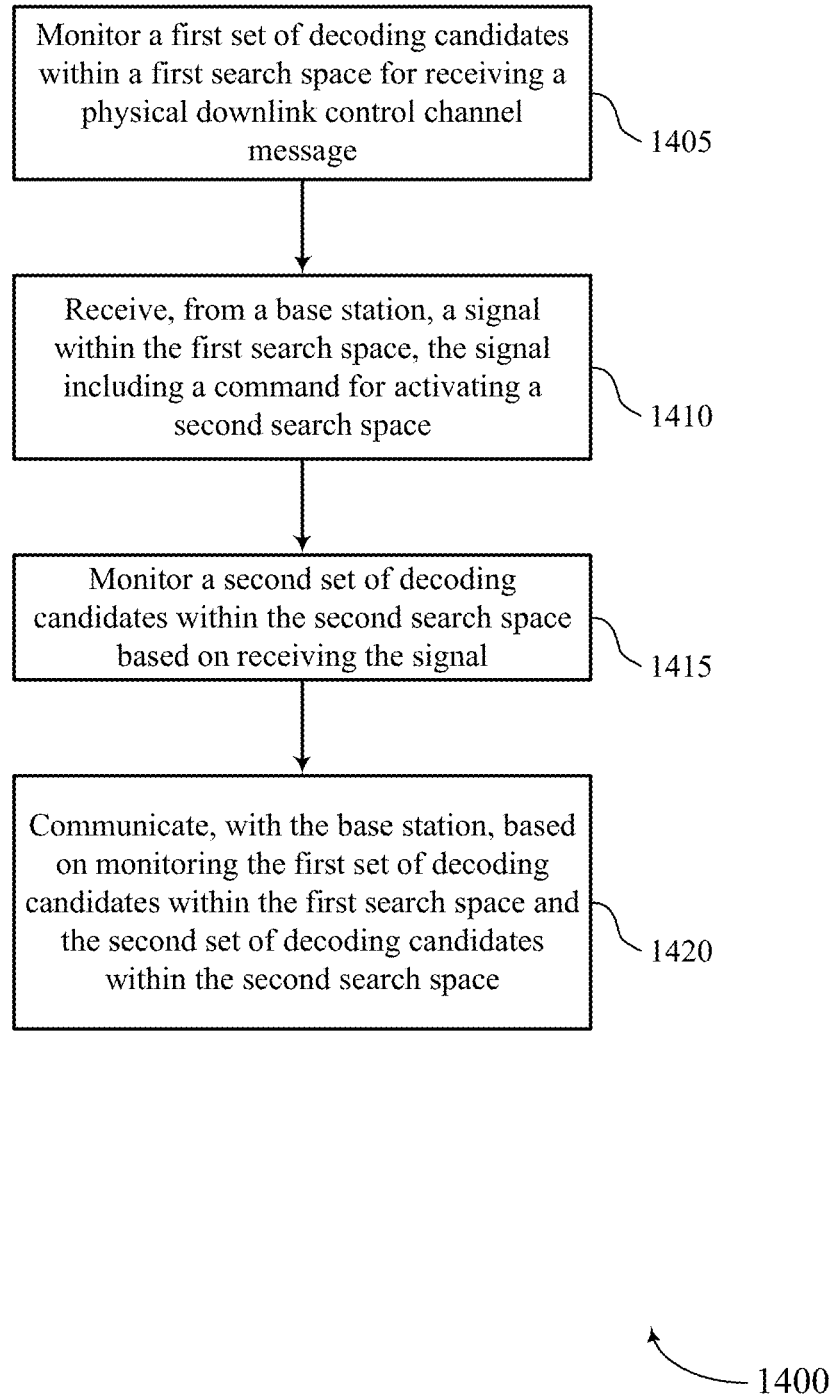
FIGS. 14 through 17 show flowcharts illustrating methods that support search space activation for channel monitoring in accordance with aspects of the present disclosure.

FIG. 14 shows a flowchart illustrating a method 1400 that supports search space activation for channel monitoring in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may monitor a first set of decoding candidates within a first search space for receiving a physical downlink control channel message. The operations of 1405 may be performed according to the methods described herein. In some examples, aspects of the operations of 1405 may be performed by a monitoring component as described with reference to FIGS. 6 through 9.

At 1410, the UE may receive, from a base station, a signal within the first search space, the signal including a command for activating a second search space. In some cases, the UE may receive the activation message in a medium access layer control element. For example, the UE may receive a DCI on the first search space, and may then receive the medium access layer control element of a downlink channel. The medium access layer control element may indicate the activation of the second search space. The operations of 1410 may be performed according to the methods described herein. In some examples, aspects of the operations of 1410 may be performed by a signal receiving component as described with reference to FIGS. 6 through 9.

At 1415, the UE may monitor a second set of decoding candidates within the second search space based on receiving the signal. The operations of 1415 may be performed according to the methods described herein. In some examples, aspects of the operations of 1415 may be performed by a monitoring component as described with reference to FIGS. 6 through 9.

At 1420, the UE may communicate, with the base station, based on monitoring the first set of decoding candidates within the first search space and the second set of decoding candidates within the second search space. The operations of 1420 may be performed according to the methods described herein. In some examples, aspects of the operations of 1420 may be performed by a communication component as described with reference to FIGS. 6 through 9.

Figure 15:
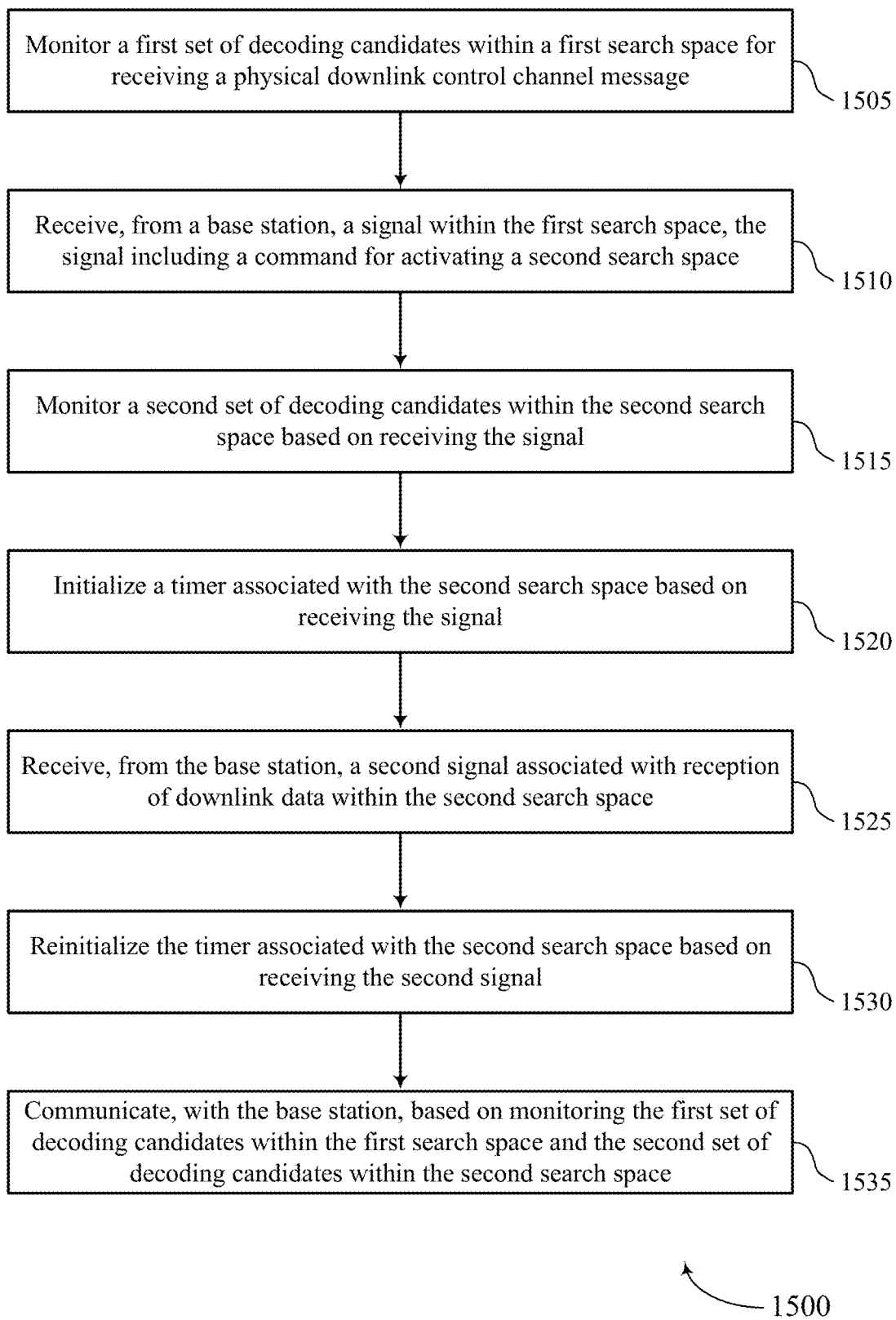

FIG. 15 shows a flowchart illustrating a method 1500 that supports search space activation for channel monitoring in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may monitor a first set of decoding candidates within a first search space for receiving a physical downlink control channel message. The operations of 1505 may be performed according to the methods described herein. In some examples, aspects of the operations of 1505 may be performed by a monitoring component as described with reference to FIGS. 6 through 9.

At 1510, the UE may receive, from a base station, a signal within the first search space, the signal including a command for activating a second search space. The operations of 1510 may be performed according to the methods described herein. In some examples, aspects of the operations of 1510 may be performed by a signal receiving component as described with reference to FIGS. 6 through 9.

At 1515, the UE may monitor a second set of decoding candidates within the second search space based on receiving the signal. The operations of 1515 may be performed according to the methods described herein. In some examples, aspects of the operations of 1515 may be performed by a monitoring component as described with reference to FIGS. 6 through 9.

At 1520, the UE may initialize a timer associated with the second search space based on receiving the signal. The operations of 1520 may be performed according to the methods described herein. In some examples, aspects of the operations of 1520 may be performed by a timer component as described with reference to FIGS. 6 through 9.

At 1525, the UE may receive, from the base station, a second signal associated with reception of downlink data within the second search space. The operations of 1525 may be performed according to the methods described herein. In some examples, aspects of the operations of 1525 may be performed by a signal receiving component as described with reference to FIGS. 6 through 9.

At 1530, the UE may reinitialize the timer associated with the second search space based on receiving the second signal. In some cases, monitoring the second set of decoding candidates within the second search space is based on the timer. The operations of 1530 may be performed according to the methods described herein. In some examples, aspects of the operations of 1530 may be performed by a timer component as described with reference to FIGS. 6 through 9.

At 1535, the UE may communicate, with the base station, based on monitoring the first set of decoding candidates within the first search space and the second set of decoding candidates within the second search space. The operations of 1535 may be performed according to the methods described herein. In some examples, aspects of the operations of 1535 may be performed by a communication component as described with reference to FIGS. 6 through 9.

Figure 16:
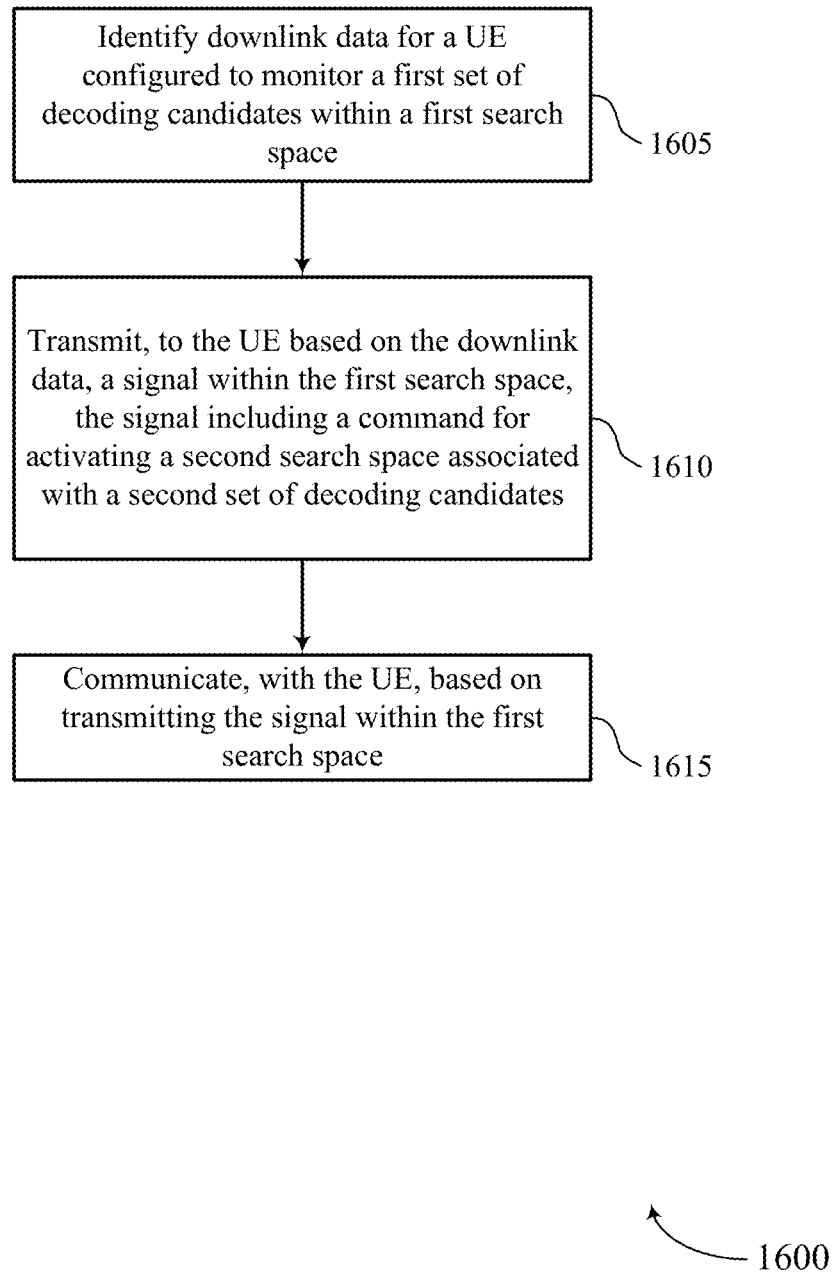

FIG. 16 shows a flowchart illustrating a method 1600 that supports search space activation for channel monitoring in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may identify downlink data for a UE configured to monitor a first set of decoding candidates within a first search space. The operations of 1605 may be performed according to the methods described herein. In some examples, aspects of the operations of 1605 may be performed by a data identification component as described with reference to FIGS. 10 through 13.

At 1610, the base station may transmit, to the UE based on the downlink data, a signal within the first search space, the signal including a command for activating a second search space associated with a second set of decoding candidates. The operations of 1610 may be performed according to the methods described herein. In some examples, aspects of the operations of 1610 may be performed by a signal transmission component as described with reference to FIGS. 10 through 13.

At 1615, the base station may communicate, with the UE, based on transmitting the signal within the first search space. The operations of 1615 may be performed according to the methods described herein. In some examples, aspects of the operations of 1615 may be performed by a communication component as described with reference to FIGS. 10 through 13.

Figure 17:
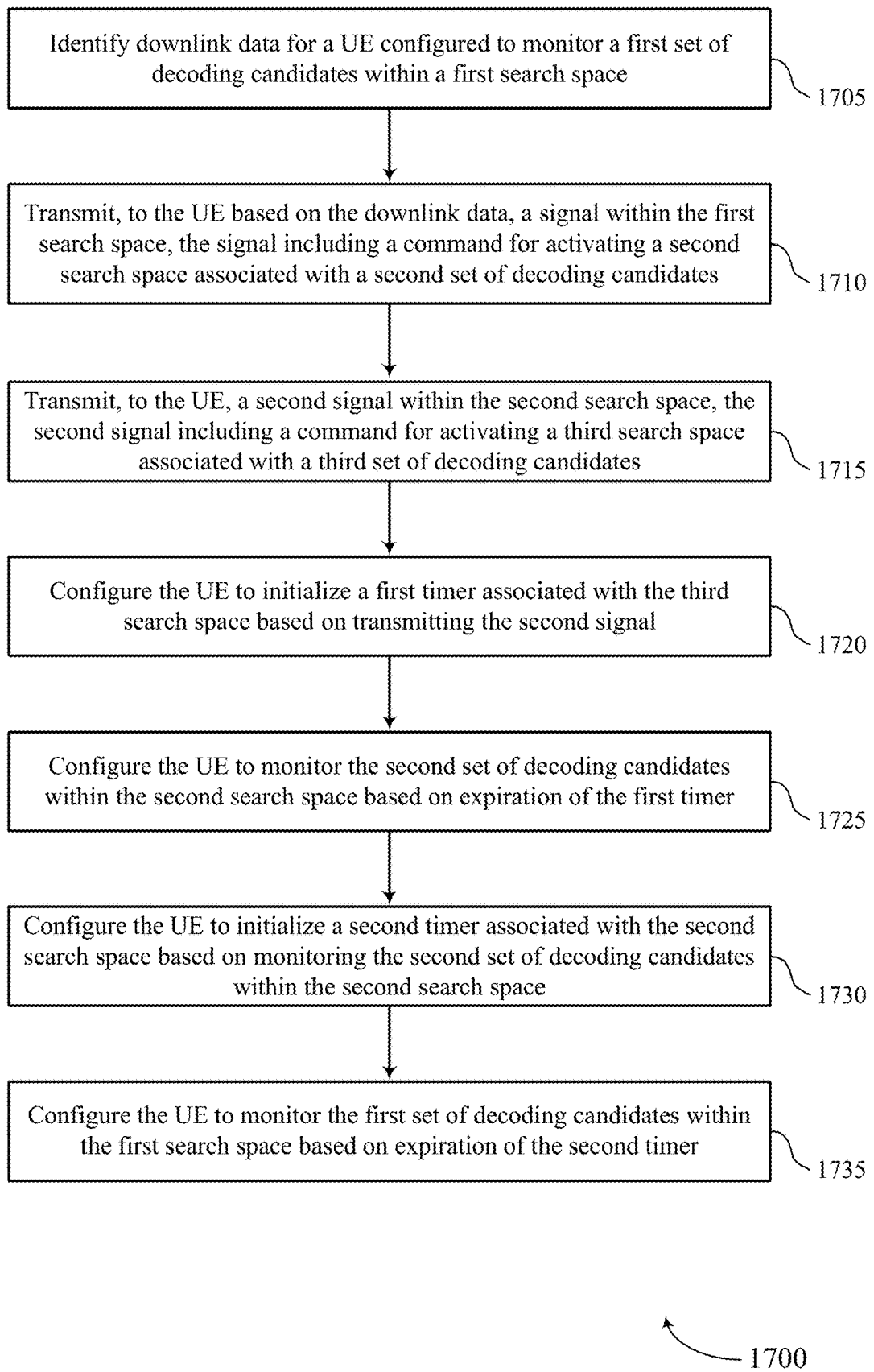

FIG. 17 shows a flowchart illustrating a method 1700 that supports search space activation for channel monitoring in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may identify downlink data for a UE configured to monitor a first set of decoding candidates within a first search space. The operations of 1705 may be performed according to the methods described herein. In some examples, aspects of the operations of 1705 may be performed by a data identification component as described with reference to FIGS. 10 through 13.

At 1710, the base station may transmit, to the UE based on the downlink data, a signal within the first search space, the signal including a command for activating a second search space associated with a second set of decoding candidates. The operations of 1710 may be performed according to the methods described herein. In some examples, aspects of the operations of 1710 may be performed by a signal transmission component as described with reference to FIGS. 10 through 13.

At 1715, the base station may transmit, to the UE, a second signal within the second search space, the second signal including a command for activating a third search space associated with a third set of decoding candidates. The operations of 1715 may be performed according to the methods described herein. In some examples, aspects of the operations of 1715 may be performed by a signal transmission component as described with reference to FIGS. 10 through 13.

At 1720, the base station may configure the UE to initialize a first timer associated with the third search space based on transmitting the second signal. The operations of 1720 may be performed according to the methods described herein. In some examples, aspects of the operations of 1720 may be performed by a timer component as described with reference to FIGS. 10 through 13.

At 1725, the base station may configure the UE to monitor the second set of decoding candidates within the second search space based on expiration of the first timer. The operations of 1725 may be performed according to the methods described herein. In some examples, aspects of the operations of 1725 may be performed by a configuring component as described with reference to FIGS. 10 through 13.

At 1730, the base station may configure the UE to initialize a second timer associated with the second search space based on monitoring the second set of decoding candidates within the second search space. The operations of 1730 may be performed according to the methods described herein. In some examples, aspects of the operations of 1730 may be performed by a timer component as described with reference to FIGS. 10 through 13.

At 1735, the base station may configure the UE to monitor the first set of decoding candidates within the first search space based on expiration of the second timer. The operations of 1735 may be performed according to the methods described herein. In some examples, aspects of the operations of 1735 may be performed by a configuring component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring a first set of decoding candidates within a first search space for receiving a physical downlink control channel message;
receiving, from a base station, a signal within the first search space, the signal comprising a command for activating a second search space;
transmitting, to the base station, a message acknowledging the signal received within the first search space;
monitoring a second set of decoding candidates within the second search space based at least in part on receiving the signal and transmitting the message; and
communicating, with the base station, based at least in part on monitoring the first set of decoding candidates within the first search space and the second set of decoding candidates within the second search space.

2. The method of claim 1, wherein:
monitoring the first set of decoding candidates within the first search space and monitoring the second set of decoding candidates within the second search space occur concurrently.

3. The method of claim 1, further comprising:
monitoring the first set of decoding candidates within the first search space for a threshold duration after receiving the signal, wherein monitoring the second set of decoding candidates within the second search space occurs after expiration of the threshold duration.

4. The method of claim 1, further comprising:
receiving, from the base station, a second signal within the first search space, the second signal comprising a command for releasing the first search space, wherein monitoring the second set of decoding candidates within the second search space is based at least in part on receiving the second signal.

5. The method of claim 1, further comprising:
ceasing monitoring the first set of decoding candidates within the first search space based at least in part on receiving the signal, wherein the signal comprises a downlink control indicator.

6. The method of claim 5, further comprising:
identifying an index value of a location of the downlink control indicator; and
determining one or more monitoring occasions for the second search space based at least in part on the index value of the location, wherein monitoring the second set of decoding candidates is based at least in part on the one or more monitoring occasions.

7. The method of claim 5, further comprising:
identifying a bitmap included in the downlink control indicator; and
determining one or more monitoring occasions for the second search space based at least in part on the bitmap, wherein monitoring the second set of decoding candidates is based at least in part on the one or more monitoring occasions.

8. The method of claim 1, further comprising:
initializing a timer associated with the second search space based at least in part on receiving the signal, wherein monitoring the second set of decoding candidates within the second search space is based at least in part on the timer.

9. The method of claim 1, further comprising:
initializing a timer associated with the second search space based at least in part on receiving the signal;
receiving, from the base station, a second signal associated with reception of downlink data within the second search space; and
reinitializing the timer associated with the second search space based at least in part on receiving the second signal, wherein monitoring the second set of decoding candidates within the second search space is based at least in part on the timer.

10. The method of claim 9, further comprising:
ceasing monitoring the second set of decoding candidates within the second search space based at least in part on expiration of the timer.

11. The method of claim 1, further comprising:
receiving, from the base station, a second signal within the second search space, the second signal comprising a command for releasing the second search space, wherein the second signal is included in a downlink control indicator; and ceasing monitoring the second set of decoding candidates within the second search space based at least in part on receiving the second signal.

12. The method of claim 1, further comprising:
receiving, from the base station, a second signal associated with reception of downlink data within the first search space; and
ceasing monitoring the second set of decoding candidates within the second search space based at least in part on receiving the second signal.

13. The method of claim 1, further comprising:
transmitting, to the base station, a scheduling request for an upcoming uplink transmission, wherein monitoring the second set of decoding candidates within the second search space is based at least in part on transmitting the scheduling request.

14. The method of claim 1, further comprising:
receiving, from the base station, a second signal within the second search space, the second signal comprising a command for activating a third search space; and
monitoring a third set of decoding candidates within the third search space based at least in part on receiving the second signal, wherein a quantity of the third set of decoding candidates within the third search space is greater than a quantity of the second set of decoding candidates within the second search space, or wherein a quantity of one or more monitoring occasions for the third search space is greater than a quantity of one or more monitoring occasions for the second search space.

15. The method of claim 14, further comprising:
receiving, from the base station, a third signal within the third search space, the third signal comprising a command for releasing the third search space and reverting back to the second search space; and
monitoring the second set of decoding candidates within the second search space based at least in part on receiving the third signal.

16. The method of claim 14, further comprising:
receiving, from the base station, a third signal within the third search space, the third signal comprising a command for releasing the third search space and reverting back to the first search space; and
monitoring the first set of decoding candidates within the first search space based at least in part on receiving the third signal.

17. The method of claim 14, further comprising:
initializing a first timer associated with the third search space based at least in part on receiving the second signal;
monitoring the second set of decoding candidates within the second search space based at least in part on expiration of the first timer;
initializing a second timer associated with the second search space based at least in part on monitoring the second set of decoding candidates within the second search space; and
monitoring the first set of decoding candidates within the first search space based at least in part on expiration of the second timer.

18. A method for wireless communication, comprising:
identifying downlink data for a user equipment configured to monitor a first set of decoding candidates within a first search space;
transmitting, to the user equipment based at least in part on the downlink data, a signal within the first search space, the signal comprising a command for activating a second search space associated with a second set of decoding candidates; and
receiving, from the user equipment, a message acknowledging the signal transmitted within the first search space;
communicating, with the user equipment, based at least in part on transmitting the signal within the first search space and receiving the message.

19. The method of claim 18, further comprising:
configuring the user equipment to monitor the second set of decoding candidates within the second search space based at least in part on transmitting the signal.

20. The method of claim 18, further comprising:
configuring the user equipment to concurrently monitor the first set of decoding candidates within the first search space and the second set of decoding candidates within the second search space.

21. The method of claim 18, further comprising:
transmitting, to the user equipment, a second signal within the first search space, the second signal comprising a command for releasing the first search space;
configuring the user equipment to monitor the second set of decoding candidates within the second search space based at least in part on transmitting the second signal; and
configuring the user equipment to cease monitoring the first set of decoding candidates within the first search space based at least in part on transmitting the signal, wherein the signal comprises a downlink control indicator.

22. The method of claim 18, further comprising:
configuring the user equipment to initialize a timer associated with the second search space based at least in part on transmitting the signal;
transmitting, to the user equipment, a second signal associated with transmission of downlink data within the second search space;
configuring the user equipment to reinitialize the timer associated with the second search space based at least in part on transmitting the second signal;
configuring the user equipment to monitor the second set of decoding candidates within the second search space is based at least in part on the timer; and
configuring the user equipment to cease monitoring the second set of decoding candidates within the second search space based at least in part on expiration of the timer.

23. The method of claim 18, further comprising:
transmitting, to the user equipment, a second signal within the second search space, the second signal comprising a command for releasing the second search space, wherein the second signal is included in a downlink control indicator; and
configuring the user equipment to cease monitoring the second set of decoding candidates within the second search space based at least in part on transmitting the second signal.

24. The method of claim 18, further comprising:
transmitting, to the user equipment, a second signal associated with transmission of downlink data within the first search space; and
configuring the user equipment to cease monitoring the second set of decoding candidates within the second search space based at least in part on transmitting the second signal.

25. The method of claim 18, further comprising:
transmitting, to the user equipment, a second signal within the second search space, the second signal comprising a command for activating a third search space associated with a third set of decoding candidates.

26. An apparatus for wireless communication, comprising: a processor, memory in electronic communication with the processor; and
instructions stored in the memory and executable by the processor to cause the apparatus to:
monitor a first set of decoding candidates within a first search space for receiving a physical downlink control channel message;
receive, from a base station, a signal within the first search space, the signal comprising a command for activating a second search space;
transmit, to the base station, a message acknowledging the signal received within the first search space;
monitor a second set of decoding candidates within the second search space based at least in part on receiving the signal and transmitting the message; and
communicate, with the base station, based at least in part on monitoring the first set of decoding candidates within the first search space and the second set of decoding candidates within the second search space.

27. An apparatus for wireless communication, comprising: a processor, memory in electronic communication with the processor; and
instructions stored in the memory and executable by the processor to cause the apparatus to:
identify downlink data for a user equipment configured to monitor a first set of decoding candidates within a first search space;
transmit, to the user equipment based at least in part on the downlink data, a signal within the first search space, the signal comprising a command for activating a second search space associated with a second set of decoding candidates; and
receive, from the user equipment, a message acknowledging the signal transmitted within the first search space;
communicate, with the user equipment, based at least in part on transmitting the signal within the first search space and receiving the message.

28. The method of claim 1, wherein:
a quantity of the second set of decoding candidates within the second search space is greater than a quantity of the first set of decoding candidates within the first search space, or wherein a quantity of one or more monitoring occasions for the second search space is greater than a quantity of one or more monitoring occasions for the first search space.

29. The method of claim 18, wherein:
a quantity of the second set of decoding candidates within the second search space is greater than a quantity of the first set of decoding candidates within the first search space, or wherein a quantity of one or more monitoring occasions for the second search space is greater than a quantity of one or more monitoring occasions for the first search space.

30. The apparatus of claim 26, wherein:
a quantity of the second set of decoding candidates within the second search space is greater than a quantity of the first set of decoding candidates within the first search space, or wherein a quantity of one or more monitoring occasions for the second search space is greater than a quantity of one or more monitoring occasions for the first search space.

\* \* \* \* \*